(12) United States Patent
Emura

(10) Patent No.: US 7,836,479 B2
(45) Date of Patent: *Nov. 16, 2010

(54) INFORMATION PROVISIONING APPARATUS AND INFORMATION PROVISIONING METHOD

(75) Inventor: Koichi Emura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 9 days.

This patent is subject to a terminal disclaimer.

(21) Appl. No.: 12/111,021

(22) Filed: Apr. 28, 2008

(65) Prior Publication Data

US 2008/0209485 A1    Aug. 28, 2008

Related U.S. Application Data

(63) Continuation of application No. 10/019,319, filed as application No. PCT/JP00/04736 on Jul. 14, 2000, now Pat. No. 7,383,566.

(30) Foreign Application Priority Data

Jul. 14, 1999   (JP) .................... 11-200095

(51) Int. Cl.
    *G06F 17/30*    (2006.01)
(52) U.S. Cl. .................... 725/114
(58) Field of Classification Search ......... 370/472, 370/474, 476, 527–529; 725/40, 56, 116, 725/144, 146
    See application file for complete search history.

(56) References Cited

U.S. PATENT DOCUMENTS

| | | | |
|---|---|---|---|
| 6,151,602 A | 11/2000 | Hejlsberg et al. | |
| 6,263,497 B1 | 7/2001 | Maeda et al. | |
| 6,295,380 B1 | 9/2001 | Takahashi | |
| 6,493,720 B1 | 12/2002 | Chu et al. | |
| 6,567,980 B1 | 5/2003 | Jain et al. | |
| 6,574,655 B1 | 6/2003 | Libert et al. | |
| 6,877,134 B1 | 4/2005 | Fuller et al. | |
| 7,050,503 B2 * | 5/2006 | Prakash et al. | 375/240.25 |
| 7,428,547 B2 * | 9/2008 | Basso et al. | 707/101 |
| 2001/0040903 A1 | 11/2001 | Negishi et al. | |

FOREIGN PATENT DOCUMENTS

EP    0862330    9/1998

(Continued)

OTHER PUBLICATIONS

"SXML: Streaming XML" by Rogge et al., Proceedings of PRORISC/IEEE Benelux Workshop of Circuits, Systems and Signal Processing, XP002209652, pp. 389-393, Nov. 1999.

(Continued)

*Primary Examiner*—Pankaj Kumar
*Assistant Examiner*—Duc T Duong
(74) *Attorney, Agent, or Firm*—Greenblum & Bernstein P.L.C.

(57) ABSTRACT

The present invention comprises a synchronization section for performing synchronization of an AV stream and metadata, and a capsulization section for capsulizing an AV stream and metadata every metadata unit, and by reconfiguring metadata unit by unit and capsulizing an AV stream by this means, makes possible partial execution of metadata, and makes it possible to carry out program distribution for processing a segment comprising part of an AV stream, speeding up of response times, reduction of the necessary storage capacity, and reduction of network traffic.

9 Claims, 19 Drawing Sheets

FOREIGN PATENT DOCUMENTS

| | | |
|---|---|---|
| EP | 0868087 | 9/1998 |
| EP | 0895157 | 2/1999 |
| JP | 10-145755 | 5/1998 |
| JP | 2000-224257 | 8/2000 |
| JP | 2000-261742 | 9/2000 |
| JP | 2000-261754 | 9/2000 |
| WO | 99/21364 | 4/1999 |

OTHER PUBLICATIONS

"EBU/SMPTE Task Force for Harmonized Standards for the Exchange of Programme Material as Bitstreams", EBU Technical Review, XP002209653, pp. 1-191, Aug. 5, 1998.

"Wrappers and Metadata Progress Report", by Morgan, SMPTE Journal, vol. 108, No. 4, XP000827271, ISSN: 0036-1682, pp. 226-231, Apr. 1999.

English language Abstract of JP 10-145755, May 29, 1998.
English language Abstract of JP 2000-261742, Sep. 22, 2000.
English language Abstract of JP 2000-261754, Sep. 22, 2000.
English language Abstract of JP 2000-224257, Aug. 11, 2000.

"Task Force for Harmonized Standards for the Exchange of Program Material as Bitstreams, " Society of Motion Picture and Television Engineers, European Broadcasting Union, (Jul. 1998).

"A Comparison of Schemas for Video Metadata Representation" by Hunter et al., Computer Networks and ISDN Systems, vol. 31 No. 11-16, 1999; XP000861557, pp. 1431-1451.

Ceccarelli M et al., "Home Multimedia systems: on personal video libraries", Multimedia Computing and Systems, 1999, IEEE International Conference on Florence, Italy Jun. 7-11, 1999, Los Alamitos, CA, USA, IEEE Comput. Soc, US, vol. 2, Jun. 7, 1999, pp. 1082-1085, XP010519568.

* cited by examiner metadata.dtb

```
<!ELEMENT   metadata     (mpu +) >
<!ELEMENT   mpu          SYSTEM "mpu.dtd" >
% mpu ;
```

401

FIG. 4A mpu.dtb

```
<!ELEMENT   mpu          (element_data +) >
<!ELEMENT   mpu          no   NMTOKEN  # REQUIRED>
<!ELEMENT   element_data SYSTEM "user_defined.dtd" >
% user_defined ;
```

501:
```
<?xml version = "1.0" encoding = "Shift_JIS" ?>
<!DOCTYPE metadata SYSTEM "metadata.dtd" >
<metadat>
    <mpu no = "1" > ... </mpu>
    <mpu no = "2" > ... </mpu>
    <mpu no = "3" > ... </mpu>
        ...
</metadata>
```

FIG. 5A

502:
```
<?xml version = "1.0" encoding = "Shift_JIS" ?>
<!DOCTYPE mpu SYSTEM "mpu.dtd" >
<mpu no = "1" >
    <user_defined.dtd>
        ...
</mpu>
```

FIG. 5B

| SYNTAX | NUMBER OF BITS | MNEMONIC |
|---|---|---|
| metadata () { <br> 601 — metadata_type <br> 602 — metadata_subtype <br> 603 — MPU_length <br> 604 — media_sync_flag <br> if (media_sync_flag == "1") { <br> 605 — overwirte_flag <br>   for (j = D : i < MPU_length − 2 : i + = (M + 14)) { <br>     606 — element_data_length <br>     607 — start_time () <br>     607 — duration () <br>     608 — element_data  609 <br>   } <br>   reserved <br> } <br> 610 { else { <br>   for (j = D : i < MPU_length − 1 : i + = (M + 2)) { <br>     element_data_length <br>     element_data <br>   } <br> } <br> reserved <br> } | <br> 8 <br> 8 <br> 16 <br> 1 <br> <br> 1 <br> <br> 16 <br> 48 <br> 48 <br> 8M <br> <br> 7 <br> <br> <br> 16 <br> 8M <br> <br> <br> <br> 7 | <br> uimsbf <br> uimsbf <br> uimsbf <br> bslbf <br> <br> bslbf <br> <br> uimsbf <br> bslbf <br> bslbf <br> bslbf <br> <br> bslbf <br> <br> <br> uimsbf <br> bslbf <br> <br> <br> <br> bslbf |

FIG. 6

INFORMATION PROVISIONING APPARATUS AND INFORMATION PROVISIONING METHOD

This is continuation of U.S. patent application Ser. No. 10/019,319, filed Jan. 10, 2002, which was the National Stage of International Application No. PCT/JP00/04736, filed Jul. 14, 2000, the contents of which are expressly incorporated by reference herein in their entireties. The International Application was not published under PCT Article 21(2) in English.

TECHNICAL FIELD

The present invention relates to an information provision apparatus, information receiving apparatus, and storage medium, and relates in particular to an information provision apparatus, information receiving apparatus, and storage medium for video/audio, data, etc., operating via broadcast media such as digital broadcasting and communication media such as the Internet.

BACKGROUND ART

In recent years, there has been an active trend of digitalization of broadcasting, and fusion with communications has also progressed. In the field of communications, satellite digital broadcasting has already been started, and it is expected that terrestrial broadcasting will also be digitalized in the future.

As a result of digitalization of broadcast content, data broadcasting is also performed in addition to conventional video and audio. Also, in the communications field, digital content distribution via the Internet has begun with music, and Internet broadcasting stations that broadcast video have also appeared.

Henceforth, it is envisaged that continuous content media such as video and audio will enter the home via various paths (transmission media). Through such fusion and digitalization of communications and broadcasting, it has become possible to offer previously unavailable services by means of metadata that describes content or relates to content.

For example, EPG information as well as audio/video information is provided by interleaving EPG (Electric Program Guide)—"Standard specification for program arrangement information used in digital broadcasting ARIB STD-B10 Version 1.1" or "prETS 300468 Digital Broadcasting systems for television, sound and data services-Specification for Service Information (SI) in Digital Video Broadcasting (DVB) systems") used in CS digital broadcasting, in an audio/video PES (Packetized Elementary Stream) using an MPEG-2 (Motion Picture coding Experts Group phase 2—"ISO/IEC 13818-1 to 3") private section.

Also, in BS digital broadcasting, data broadcasting using MPEG-2 private PES packets is anticipated. Moreover, it is also possible to perform content management by inserting metadata that describes content in the format of user data in material transmission ("ANSI/SMPTE291M-1996 Ancillary Data Packet and Space Formatting").

A conventional information processing system will be described below using FIG. 15. FIG. 15 is a block diagram of a conventional information processing system.

An information provision node 1501 is provided with a storage section 1502 in which an AV stream and metadata for describing the AV stream are stored. Also provided in the information provision node 1501 is an information provision section 1504 that multiplexes the AV stream and metadata stored in the storage section 1502 and generates and outputs a multiplex stream 1503. The information provision section 1504 transmits the multiplex stream 1503 to an information usage node 1506 via a network 1505.

Meanwhile, the information usage node 1506 is provided with an information usage section 1507 that extracts an AV stream and metadata from a multiplex stream and executes processing on them in order to use them. The information usage node 1506 is also provided with a storage section 1508 that stores the AV stream and metadata extracted by the information usage section 1507. The information usage section 1507 reads the AV stream and metadata stored in the storage section 1508 in order to use them.

Next, the information provision section 1504 will be described using FIG. 16. FIG. 16 is a block diagram of a conventional information provision section.

The information provision section 1504 is provided with an access section 1601 that reads an AV stream and meta data from the storage section 1502. The access section 1601 outputs an AV stream 1602 and metadata 1603 to a multiplexing section 1604.

The multiplexing section 1604 transmits to the information usage node 1506 a multiplex stream 1503 that multiplexes the AV stream 1602 and metadata 1603.

Next, multiplex stream generation processing by the multiplexing section 1604 will be described using FIG. 17.

The drawing indicated by reference numeral 1503 in the drawing shows the MPEG-2 TS (Transport Stream) PES packet layer, and shows a multiplex stream. The drawing indicated by reference numeral 1702 shows a video PES packet, the drawing indicated by reference numeral 1703 shows an audio PES packet, and the drawing indicated by reference numeral 1703 shows a private PES packet. 1603 indicates the metadata PES packet layer, in which 1704 is a first PES packet comprising metadata and 1705 is a second PES packet comprising metadata.

The multiplexing section 1604 divides the metadata 1603 to make private PES packets, inserts the first PES packet 1704 and second PES packet 1705 in order as appropriate between AV streams consisting of video PES packets 1701 and audio PES packets 1702, and obtains a multiplex stream 1503 that is an MPEG-2 TS.

As conventional metadata is AV stream ancillary data—for example, small amounts of data such as titles-processing has been performed with metadata alone. That is to say, it has not been necessary to provide time synchronization of metadata with an AV stream. Therefore, since conventional metadata does not have a configuration that provides for synchronization with an AV stream, metadata has been packetized using virtually the same size, and has been inserted as appropriate between AV streams at virtually equal intervals.

The multiplexing section 1604 then sends this multiplex stream 1503 to the information usage node 1506.

Next, the information usage section 1507 will be described using FIG. 18. FIG. 18 is a block diagram of a conventional information usage section.

The information usage section 1507 is provided with an extraction section 1803 that performs separation and extraction, and output, of an AV stream 1801 and metadata 1802. The extraction section 1803 outputs the separated and extracted AV stream 1801 and metadata 1802 to an access section 1804.

The access section 1804 stores the AV stream 1801 and metadata 1802 input from the extraction section 1803 in a storage section 1508. Also, the access section 1804 outputs the AV stream 1805 and metadata 1806 read from the storage section 1508 to a display section 1807. The display section 1807 displays either or both of the AV stream 1805 and metadata 1806 input from the access section 1804.

Next, the processing of the information usage section 1507 will be described using FIG. 19. FIG. 19 is a processing flowchart of a conventional information usage section.

The extraction section 1803 performs metadata parsing—that is, syntax analysis (ST1901). Then, execution of the processing of the access section 1804 and display section 1807 is performed (ST1902).

In this way, a conventional information processing system can display a description relating to AV information, in addition to AV information, by means of the information usage node 1506 by having the information provision node 1501 transmit a multiplex stream multiplexing an AV stream and metadata to the information usage node 1506.

In recent years, a demand has arisen for various kinds of information to be included in metadata, and for metadata to be processed coupled with an AV stream, rather than having metadata simply as ancillary data for an AV stream.

However, in the above-described conventional information processing system, metadata parsing cannot be carried out until all the metadata has been acquired.

For example, if metadata begins with <metadata>, metadata parsing cannot be carried out until data </metadata> indicating the end of the metadata arrives.

For this reason, the metadata processing time is closely tied to the AV stream display or processing time, and since an AV stream is processed in accordance with the metadata itself, processing cannot be started until all the metadata has been received. Therefore, in a conventional information processing system, there is a problem in that it is difficult to process an AV stream in small units.

Also, metadata is distributed virtually uniformly in a multiplex stream. As a result, especially when the data quantity of metadata is large, a large AV stream quantity must be read by the time all the metadata is read. Consequently, there are problems relating to inter-node response time delays and increased network traffic.

DISCLOSURE OF INVENTION

It is a first objective of the present invention to carry out data and program distribution for processing a segment comprising part of an AV stream, speeding up of response times, reduction of the necessary storage capacity, and reduction of network traffic, by making possible partial execution of metadata.

Also, it is a second objective of the present invention to make processing of a segment comprising part of an AV stream variable, and perform close synchronization between metadata and AV stream processing times, by implementing time synchronization of metadata and an AV stream.

Further, it is a third objective of the present invention to extend the degree of freedom for designing metadata for processing an AV stream.

In order to meet the first objective, the present invention is provided with a synchronization section which synchronizes a data stream segment with a unit of metadata corresponding to it, and a capsulization section which capsulizes a data stream packet and metadata unit packet after synchronization and generates a capsulized stream.

By this means, partial execution of metadata is made possible by reconfiguring metadata unit by unit and capsulizing it with the data stream. As a result, it is possible to carry out data and program distribution for processing a segment comprising part of a data stream, speeding up of response times, reduction of the necessary storage capacity, and reduction of network traffic.

In order to meet the second objective, the present invention is provided with an extraction section which extracts from a capsulized stream a content data stream and metadata for describing or processing that content, a synchronization section which synchronizes metadata unitized with respect to an extracted data stream segment unit by unit with a content data stream and the corresponding metadata unit, and a processing section which processes synchronized metadata unit by unit.

By this means, it is possible to make processing for a segment comprising part of a data stream variable, and perform close synchronization between metadata and AV stream processing times.

In order to meet the third objective, the present invention uses a structured description for metadata and metadata units, and structured description re-format is performed from metadata to units and from units to metadata.

By this means, it is possible to extend the degree of freedom for designing metadata for processing a data stream. In addition, it is possible for a structured description written in XML, etc., to be used directly as metadata.

BRIEF DESCRIPTION OF DRAWINGS

FIG. 4A is a drawing showing DTD of XML of metadata according to Embodiment 1;

FIG. 4B is a drawing showing DTD of XML of an MPU according to Embodiment 1;

FIG. 5A is a drawing showing an instance of XML of metadata according to Embodiment 1;

FIG. 5B is a drawing showing an instance of XML of an MPU according to Embodiment 1;

FIG. 6 is a drawing showing the syntax of metadata according to Embodiment 1;

BEST MODE FOR CARRYING OUT THE INVENTION

With reference now to the attached drawings, embodiments of the present invention will be explained in detail below.

Embodiment 1

Figure 1:
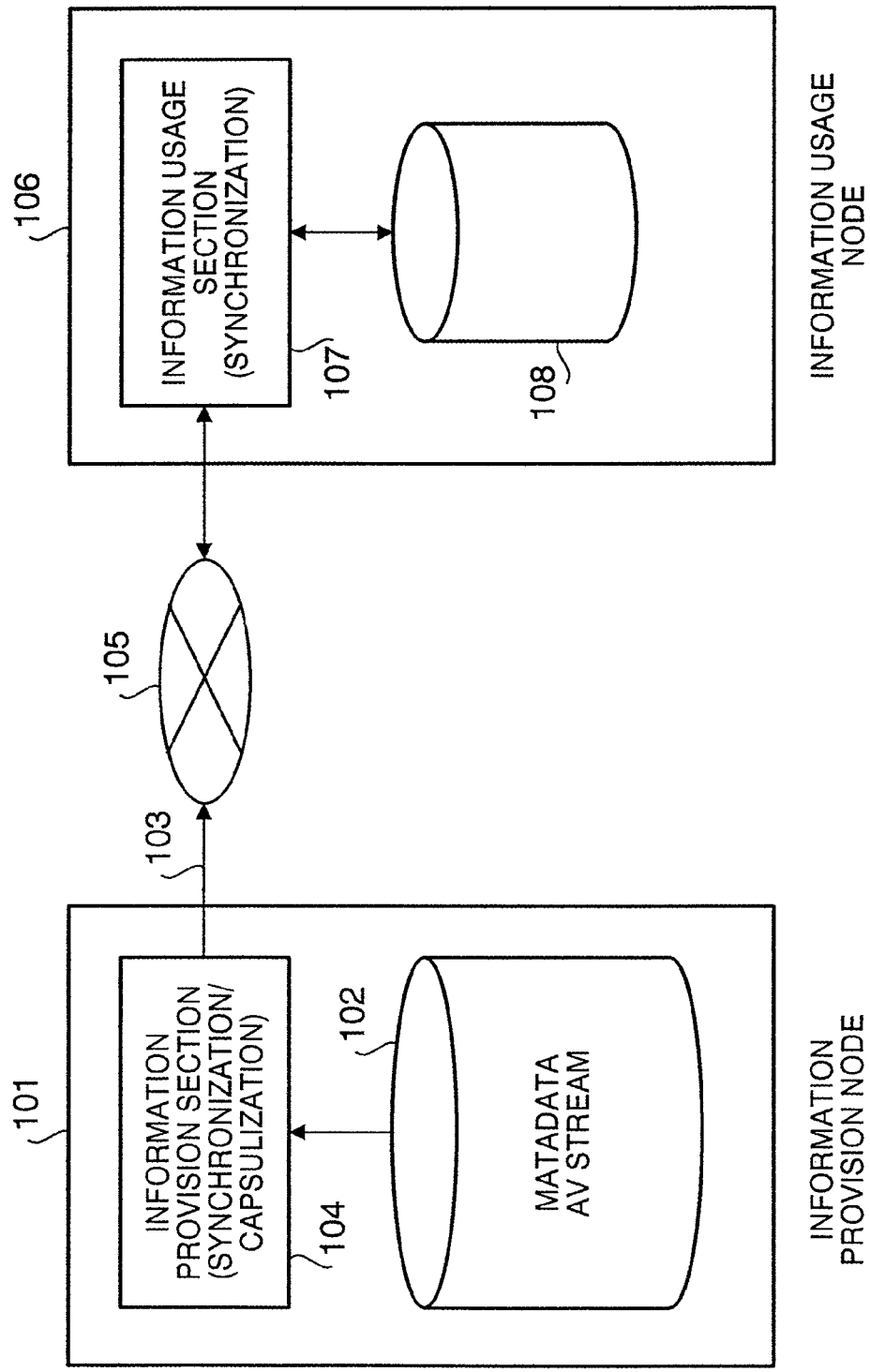
FIG. 1 is a block diagram of an information processing system according to Embodiment 1 of the present invention.

An information processing system according to Embodiment 1 of the present invention will be described below. FIG. 1 is a block diagram of an information processing system according to Embodiment 1.

An information provision node 101 is provided with a storage section 102 in which an AV stream and AV stream related metadata are stored. The metadata is data that describes the related AV stream, or data for processing the metadata itself, or the like. Also provided in the information provision node 101 is an information provision section 104 that multiplexes the AV stream and metadata stored in the storage section 102 and generates and outputs a capsulized stream 103. The information provision section 104 transmits the capsulized stream 103 via a network 105 to an information usage node 106, which is an apparatus on the information receiving side.

Meanwhile, the information usage node 106 is provided with an information usage section 107 that extracts an AV stream and metadata from the capsulized stream 103 and executes predetermined processing on them in order to use them. The information usage node 106 is also provided with a storage section 108 that stores the AV stream and metadata extracted by the information usage section 107. The information usage section 107 reads the AV stream and metadata stored in the storage section 108 in order to use them.

Figure 2:
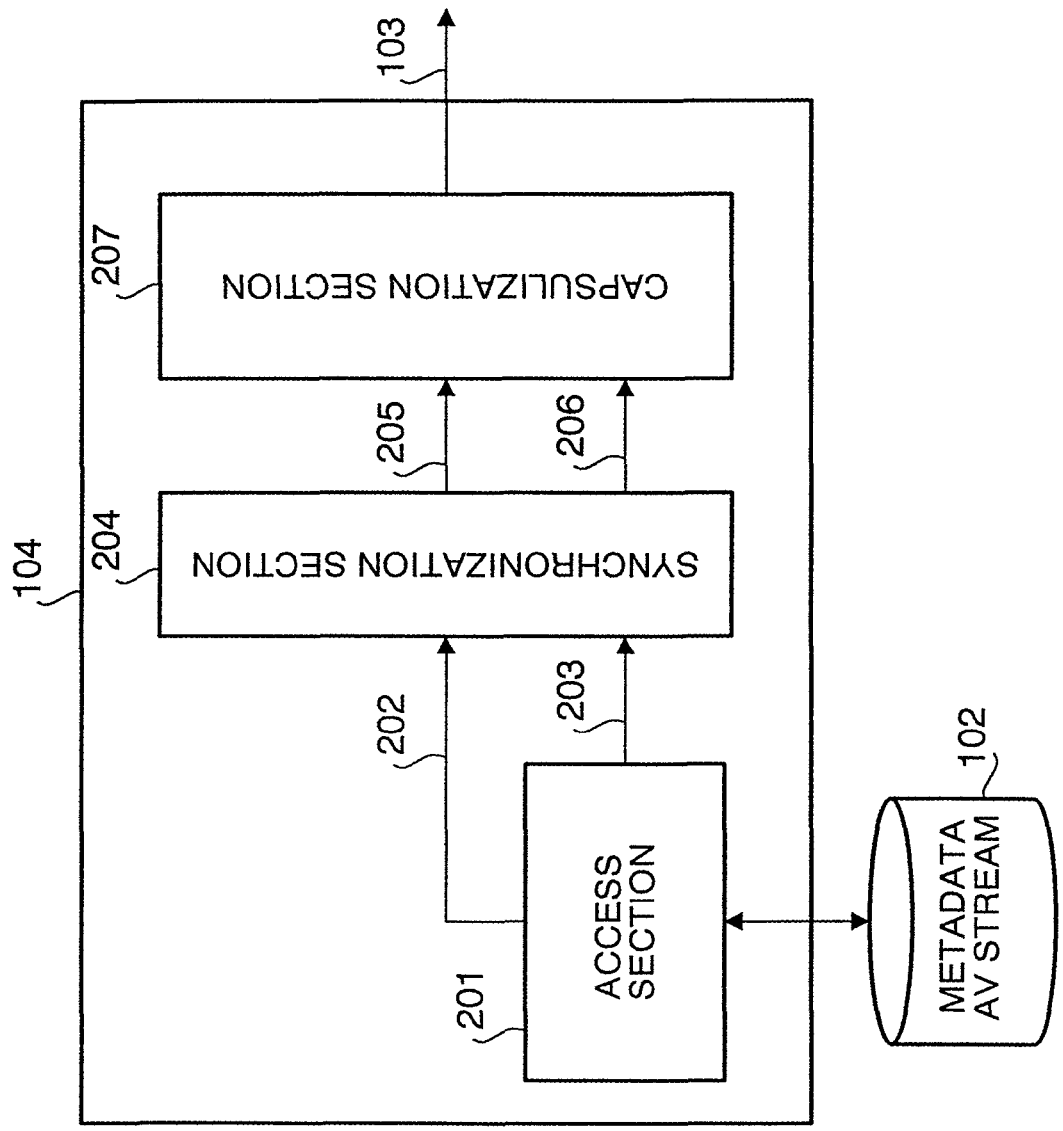
FIG. 2 is a block diagram of an information processing section according to Embodiment 1.

Next, the information provision section 104 will be described using FIG. 2. FIG. 2 is a block diagram of an information provision section according to Embodiment 1.

The information provision section 104 is provided with an access section 201 that reads an AV stream and metadata from the storage section 102. The access section 201 outputs an AV stream 202 and metadata 203 to a synchronization section 204.

The synchronization section 204 implements time synchronization for the AV stream 202 and metadata 203 read by the access section 201, and outputs the synchronized AV stream 205 and metadata 206 to a capsulization section 207.

The capsulization section 207 capsulizes the synchronized AV stream 205 and metadata 206, and transmits them to the information usage node 106 as a capsulized stream 103.

Also, the present invention unitizes metadata to enable metadata to be executed in parts. Then, AV stream segments and corresponding metadata units are synchronized, synchronized data stream packets and metadata unit packets are capsulized, and a capsulized stream is generated.

The operation of the information provision section 104 of the present invention will be described in detail below.

Figure 3A:
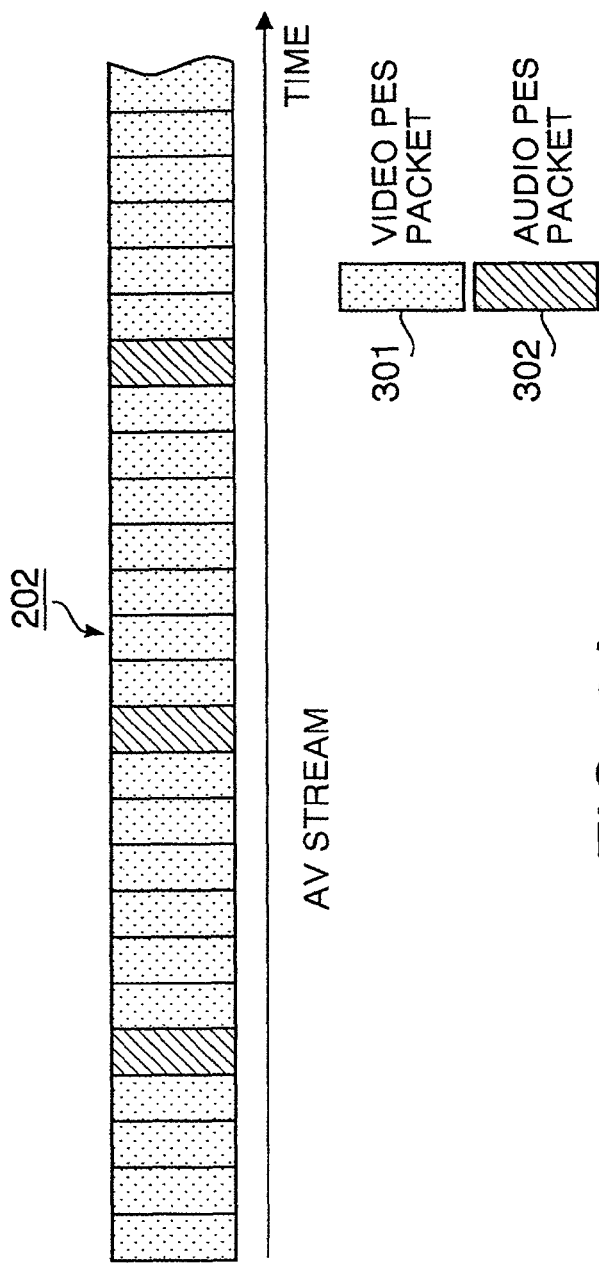
FIG. 3A is a drawing showing an AV stream according to Embodiment 1.
Figure 3B:
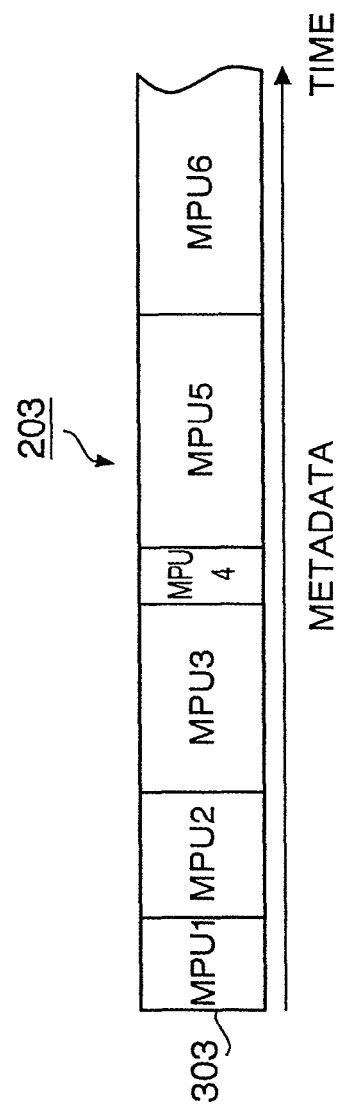
FIG. 3B is a drawing showing metadata according to Embodiment 1.

First, the AV stream 202 and metadata 203 stored in the storage section 102 will be described using FIG. 3A and FIG. 3B.

The AV stream 202 has video PES packets 301 and audio PES packets 302 interleaved to form a stream. In the present embodiment, a mode is described whereby an AV stream 202 is stored in the storage section 102, but a mode is also possible whereby a video stream and audio stream a restored.

The metadata 203 is configured so as to have a plurality of MPUs (Metadata Processing Units) 303.

The thus configured metadata 203 and AV stream 202 are read from the storage section 102 by the access section 201. Then the access section 201 outputs the read AV stream 202 and metadata 203 to the synchronization section 204.

On receiving the AV stream 202 and metadata 203, the synchronization section 204 first proceeds to processing for unitizing the metadata 203. Here, definitions of the metadata 203 and MPU 303 will be described using FIG. 4A and FIG. 4B. FIG. 4A and FIG. 4B are drawings showing DTD of XML. In FIG. 4A, 401 is a drawing showing a metadata definition (metadata.dtd) that defines the metadata 203. In FIG. 4B, the drawing indicated by reference numeral 402 shows an MPU definition (mpu.dtd) that defines an MPU 303.

The metadata definition 401 defines the metadata 203 as having one or more MPUs 303. For the contents of an MPU 303, referencing the MPU definition 402 is defined.

The MPU definition 402 defines an MPU 303 as having one or more element_data items. For the contents of element_data, referencing user_defined.dtd is defined. Also, the MPU definition 402 defines an MPU 303 as having a serial number no assigned.

In this way, it is possible to include in an MPU 303 different processing contents for each of various services according to user_defined.dtd. Thus, it is possible to extend the degree of freedom for designing metadata for processing an AV stream.

Also, it is possible to include in an MPU 303 processing contents not in accordance with a transmission specification, according to user_defined.dtd. By this means, metadata can also be used for a different transmission specification, making it possible to provide metadata services that support a variety of transmission specifications.

Next, the unitization of metadata 203 will be described using FIG. 5A and FIG. 5B. In FIG. 5A, the drawing indicated by reference numeral 501 shows metadata (XML instance) whereby metadata 203 is given a structured description according to metadata definition 401, and the drawing indicated by reference numeral 502 shows an MPU (XML instance) whereby an MPU 303 is given a structured description according to MPU definition 402.

As described above, according to metadata definition 401, metadata 203 is represented by a collection of MPU definitions 402. According to this metadata definition 401, what gives a structured description of metadata 203 is metadata (XML instance) 501. As can be seen from the drawing, the metadata (XML instance) 501 instance includes a plurality of MPUs 303. Also, metadata 203 is stored in the storage section 102 as metadata (XML instance) 501.

According to MPU definition 402, an MPU 303 is represented by a collection of metadata defined by user_defined.dtd. According to this MPU definition 402, what gives a structured description of MPU 303 for each MPU is MPU (XML instance) 502. As can be seen from the drawing, MPU (XML instance) 502 includes a plurality of user_defined.dtd items. Also, MPU 303 is stored in the storage section 102 as MPU (XML instance) 502.

An MPU 303 has contents <mpu> to </mpu>. That is to say, if there is information from <mpu> to </mpu>, the synchronization section 204 can grasp MPU 303 contents and can perform MPU 303 processing. For this reason, when picking out an MPU 303 from metadata 203, the synchronization section 204 extracts the contents on the inside of a tag called an MPU tag (here, <mpu>) defined by an MPU definition 402.

By having metadata 203 composed of lower-level information MPUs 303 in this way, the synchronization section 204 can perform metadata 203 processing for each MPU 303, and also closely synchronize the AV data 202 and metadata 203.

Next, the synchronization section 204 capsulizes metadata 203 sent from the access section 201 using the syntax shown in FIG. 6. FIG. 6 shows the syntax of metadata according to Embodiment 1 and Embodiment 2.

In FIG. 6, metadata_type 601 is the metadata type such as position information, content information, or program. metadata_subtype 602 is the concrete metadata type such as GPS or structured description (MPEG-7). MPU_length 603 is the data length as a number of bytes from immediately after the MPU_length field to the end of the MPU. An MPU is composed of one or more PES packets, and is the regeneration unit of metadata divided when a Metadata Elementary Stream is encoded. media_sync_flag 604 is a flag indicating the presence or absence of synchronization between the AV stream and metadata. overwrite_flag 605 is a flag indicating whether the previous metadata is to be overwritten. element_data_length 606 is the data byte length (M) of element_data 609. start_time() 607 is the start time of a segment that is a part of the AV stream indicated by the metadata. Duration() 608 is the continuation time of a segment that is part of the AV stream indicated by the metadata. element_data 609 is the actual data of the metadata.

For the syntax shown in FIG. 6, coding uses syntax 610 from else downward even when the metadata data quantity is small and unitization is not performed.

The synchronization section 204 capsulizes the AV stream segment for processing specified by the first packet's processing start time 607 and duration 608, and part of the meta data 203 corresponding to the segment for processing, as a capsulized stream (private PES).

When metadata 203 is PES-packetized, an MPU 303 is packetized together with the AV stream segment first packet processing start time (start_time), duration() 608, and actual data of the metadata as an element (element_data) in the metadata syntax shown in FIG. 6.

By this means, it is possible for an MPU 303 to have information for maintaining synchronization with the AV stream 202. Thus, synchronization is maintained between the MPU 303 and AV stream 202. In this way, metadata 203 operation can be determined on the information provision node 101 side.

Figure 7:
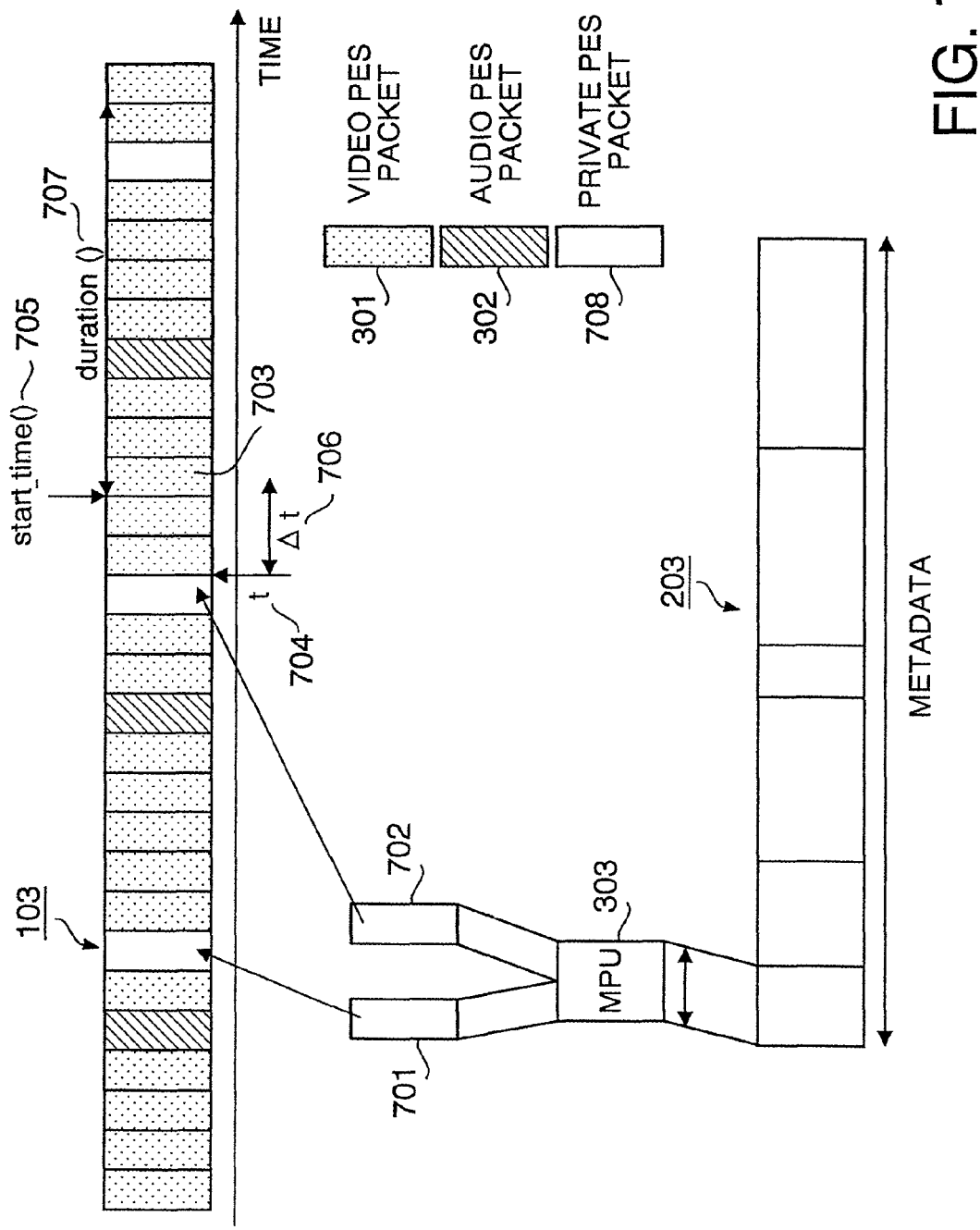
FIG. 7 is a drawing for explaining the operation of a capsulization section according to Embodiment 1.

Also, in Embodiment 1, an MPU 303 is composed of two packets—a first PES packet 701 and a second PES packet 702—as shown in FIG. 7. The operations whereby the synchronization section 204 packetizes an MPU 303 into private PES packets and interleaves these with video PES packets 301 and audio PES packets 302 in this case will be described using FIG. 7. How many packets an MPU 303 is made into can be determined arbitrarily according to the MPU 303 size and the packet size.

In the case of Embodiment 1, the first PES packet 701 and second PES packet 702 are placed as private PES packets 708 earlier in time than the first packet 703 so that the first PES packet 701 and second PES packet 702 are processed before the processing start time (start_time) 705 of the first packet of the corresponding AV stream segment.

Also, the second PES packet 702 arrival time t 704 and the corresponding first packet 703 processing start time (start_time) 705 difference Δt 706 are assigned sufficient times for the information usage section 107, which is on the information receiving side, to generate an MPU 303 from the first PES packet 701 and second PES packet 702, and execute processing based on the contents of the generated MPU 303.

Then, the AV stream 205 and metadata 206 synchronized by the synchronization section 204 in this way are input to the capsulization section 207.

The capsulization section 207 capsulizes the input AV stream 205 and metadata 206, and transmits them as a capsulized stream 103.

As described above, according to Embodiment 1, metadata can be re-formatted unit by unit and capsulized with an AV stream by providing a synchronization section 204 that maintains synchronization of the AV stream and metadata, and a capsulization section 207 that capsulizes metadata unit by unit with the AV stream. By this means, it becomes possible to perform partial execution of metadata, and to carry out program distribution for processing a segment comprising part of an AV stream, speeding up of response times, reduction of the necessary storage capacity, and reduction of network traffic.

Moreover, according to Embodiment 1, by using a structured description written using XML for metadata and metadata units, and performing structured description re-format from metadata to units and from units to metadata, it is possible to provide extensibility for metadata for processing an AV stream, and extend the degree of freedom for designing metadata. In addition, it is possible for a structured description written in XML, etc., to be used directly as metadata.

Embodiment 2

Next, an information processing system according to Embodiment 2 of the present invention will be described.

Figure 8:
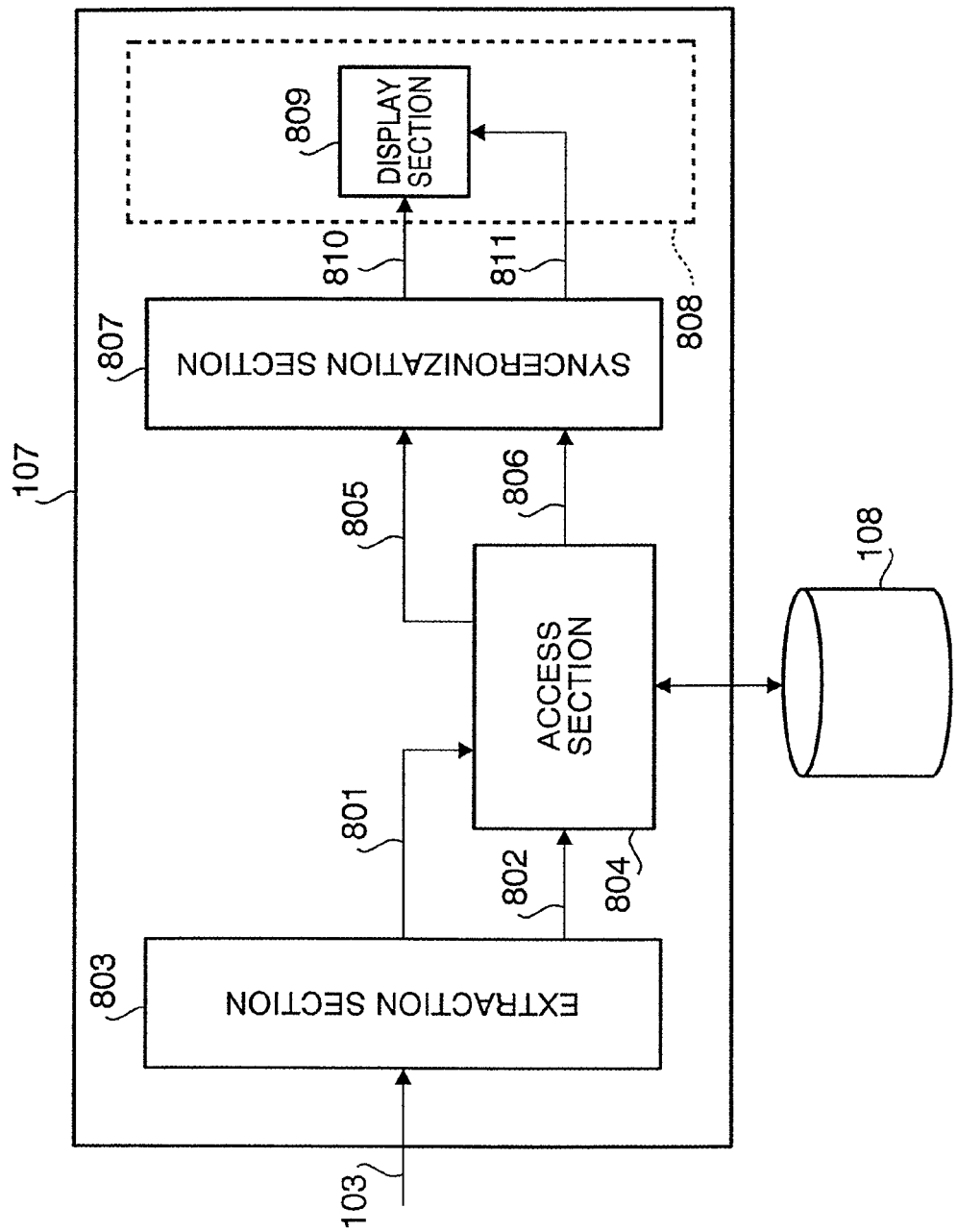
FIG. 8 is a block diagram of an information usage section according to Embodiment 2 of the present invention.

FIG. 8 is a block diagram of an information usage section 107 according to Embodiment 2.

The information usage section 107 is provided with an extraction section 803 that performs separation and extraction, and output, of an AV stream 801 and metadata 802. The extraction section 803 outputs the extracted AV stream 801 and metadata 802 to an access section 804.

The access section 804 records the AV stream 801 and metadata 802 in a storage section 108. Also, the access section 804 reads an AV stream 805 and metadata 806 stored in the storage section 108, and outputs them to a synchronization section 807.

The synchronization section 807 performs time synchronization every MPU 303 for the AV stream 805 and metadata 806 read by the access section 804, and outputs them to a core processing section 808.

The core processing section 808 is provided with a display section 809. The display section 809 performs time synchronization and display of the input synchronized AV stream 810 and metadata 811.

In this way, the information usage section 107 extracts an AV stream 801 and metadata 802 from the capsulized stream 103 in the extraction section 803. Then, in the synchronization section 807, the corresponding metadata 802 unitized in accordance with AV stream 801 segments is synchronized with the AV stream 801 unit by unit. Then the synchronized metadata 811 and AV stream 810 are displayed unit by unit by the display section 809.

Figure 9:
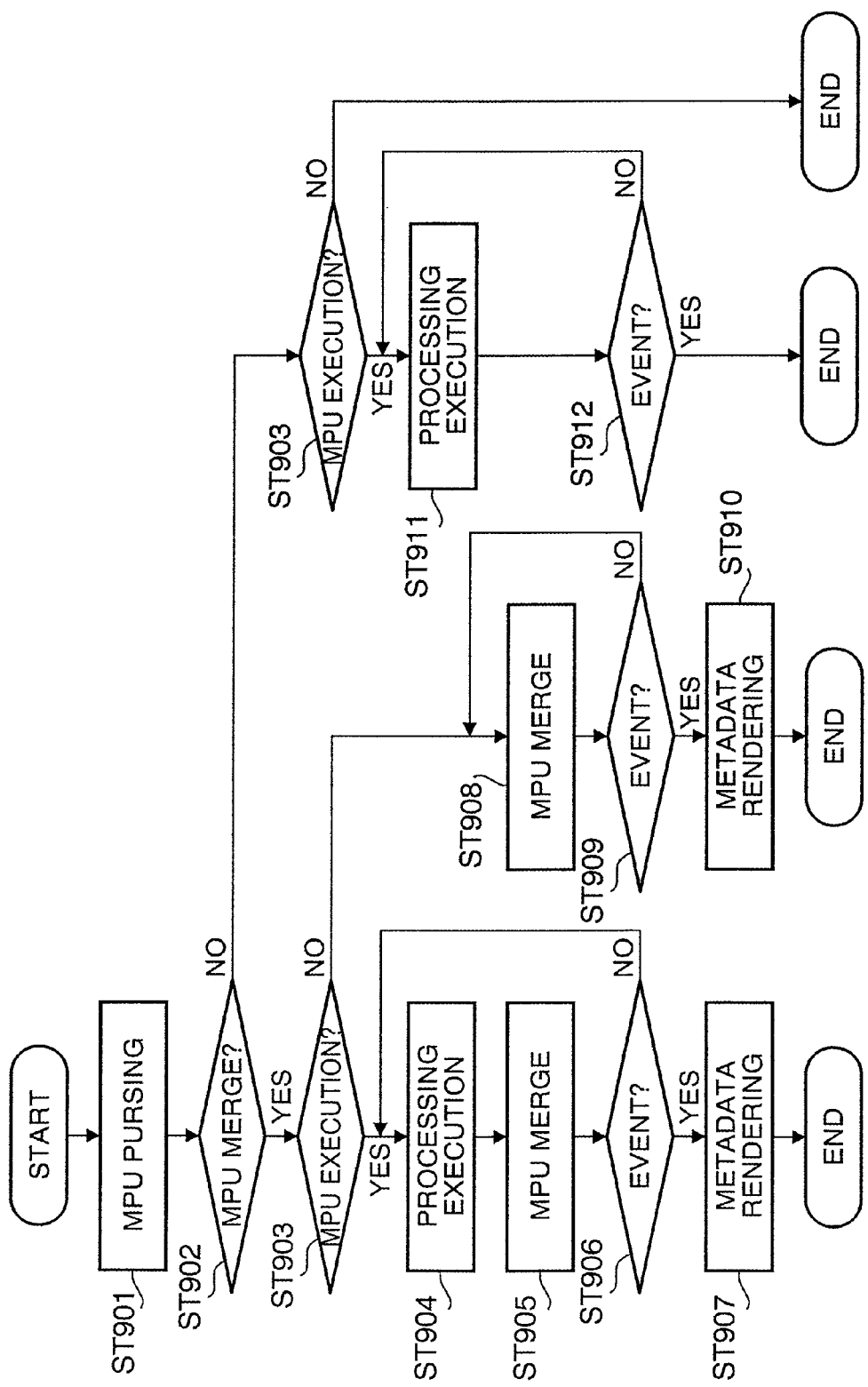
FIG. 9 is a processing flowchart showing the metadata processing operations of an information usage node according to Embodiment 2 of the present invention.

Next, the metadata processing operations of the information usage node 106 will be described in detail using the flowchart in FIG. 9. First, the extraction section 803 extracts an AV stream and metadata from the received capsulized stream 103. In addition, the information usage section 107 performs MPU 303 pursing (ST901). Next, in the information usage section 107, a check is performed as to whether the MPUs 303 are to be merged and re-formatted as metadata 802 (ST902). Then, in the information usage section 107, a check is performed as to whether MPU 303 execution is to be performed unit by unit (ST903).

If, in ST902 and ST903, the results confirmed by the information usage section 107 are MPU merging and MPU execution, processing is executed by the core processing section 808 (ST904). Then MPU merging is performed in the information usage section 107 (ST905). In Embodiment 2, this processing is display processing, but it may also be conversion processing or transfer processing as in other embodiments to be described hereafter.

Then, in the information usage section 107, judgment as to the advent of an MPU time or number limit—that is, an event that indicates an MPU processing unit—is performed (ST906), and ST904 and ST905 are repeated until the advent of an event. Event information is given to software when providing universality, or is given to a terminal beforehand when the system is used in a fixed mode.

Then, in the information usage section 107, rendering—that is to say, formatting—of the metadata is performed from the MPUs collected together in ST906. Metadata formatted on the basis of this event is stored in the storage section 108. Then the core processing section 808 reads this formatted data and performs various kinds of processing.

In this way, it is possible not only to perform processing for each MPU, which is the minimum unit of processing, in ST904, but also to perform processing based on data obtained by merging MPUs according to an event.

By this means, it is possible to set arbitrarily a unit for MPU processing according to an event, and therefore the length of AV data segments for metadata processing can be made variable. That is to say, it is possible to process metadata for small AV data and to process metadata for huge AV data. For example, it is possible to update metadata display in short cycles in a case such as a vehicle navigation system, and update metadata in long cycles in a case such as a news program.

Also, by storing this metadata that has been formatted on the basis of an event in the storage section 108, it is possible to read and process this information by means of user operations.

If, in ST902 and ST903, the results confirmed by the information usage section 107 are MPU merging and MPU non-execution, an MPU merge is performed (ST908). Then, in the information usage section 107, judgment as to the presence of an MPU time or number limit—that is, an event related to completion of an MPU merge—is performed (ST909) and ST908 is repeated until the occurrence of an event. Rendering of the metadata is then performed from the MPUs collected together in processing P107. Then, in the information usage section 107, rendering—that is to say, formatting—of the metadata is performed from the MPUs collected together in ST906 (ST910). Metadata formatted on the basis of this event is stored in the storage section 108. Then the core processing section 808 reads this formatted data and performs various kinds of processing.

In this way, it is possible not only to perform processing for each MPU, which is the minimum unit of processing, but also to perform processing based on data obtained by merging MPUs according to an event.

If, in ST902 and ST903, the results confirmed by the information usage section 107 are MPU non-merging and MPU execution, processing is executed sequentially (ST911).

Then, in the information usage section 107, judgment as to the presence of an MPU time or number limit—that is, an event that indicates an MPU processing unit—is performed (ST912), and ST911 is repeated until the occurrence of an event.

In this way, it is possible to perform processing for each MPU, which is the minimum unit of processing, and not to perform processing based on data obtained by merging MPUs according to an event.

If, in ST902 and ST903, the results confirmed by the information usage section 107 are MPU non-merging and MPU non-execution, no particular MPU-related processing is performed.

As described above, the extraction method can be changed as appropriate according to the contents contained in MPUs 303.

The operation of the information usage section 107 will now be described below. The information usage section 107 extracts an AV stream 801 and metadata 802 from the capsulized stream 103 input by the extraction section 803, and outputs them to the access section 804. After recording the AV stream 801 and metadata 802 in the storage section 108, the access section 804 reads an AV stream 805 and metadata 806, and outputs them to the synchronization section 807. The synchronization section 807 performs time synchronization every MPU 303 for the AV stream 805 and metadata 806 read by the access section 804, and outputs them to the core processing section 808. In the core processing section 808, the display section 809 performs time synchronization and display of the input AV stream 810 and metadata 811.

As described above, according to Embodiment 2, close synchronization of the metadata and AV stream processing time can be performed by providing an extraction section 803 for separating and extracting an AV stream and metadata, an access section 804 for reading and writing an AV stream and metadata in a storage section 108, a synchronization section 807 for performing synchronization of the read AV stream and metadata processing, and a display section 809, which is a core processing section 808. By this means, it is possible to vary processing for a segment, which is part of an AV stream.

Also, information relating to the display method used by the display section 809 of the core processing section 808 can be provided as metadata. Information relating to the display method includes position information for displaying metadata related information, display size information, and display update information.

By this means, an appropriate method for displaying metadata can be sent to the information provision node 101 by the information usage node 106. As a result, metadata can be displayed appropriately by the information usage node 106. Therefore, if metadata is an advertisement or the like, it is possible to make a specification that allows the advertisement to be displayed at the desired time, and if metadata is information related to program descriptions, it is possible to display the descriptive information so as not to interfere with images.

Moreover, according to Embodiment 2, by using a structured description written using XML for metadata and metadata units, and performing structured description re-format from metadata to units and from units to metadata, it is possible to extend the degree of freedom for designing metadata for processing an AV stream, and a structured description written in XML, etc., can be used directly as metadata.

Embodiment 3

Figure 10:
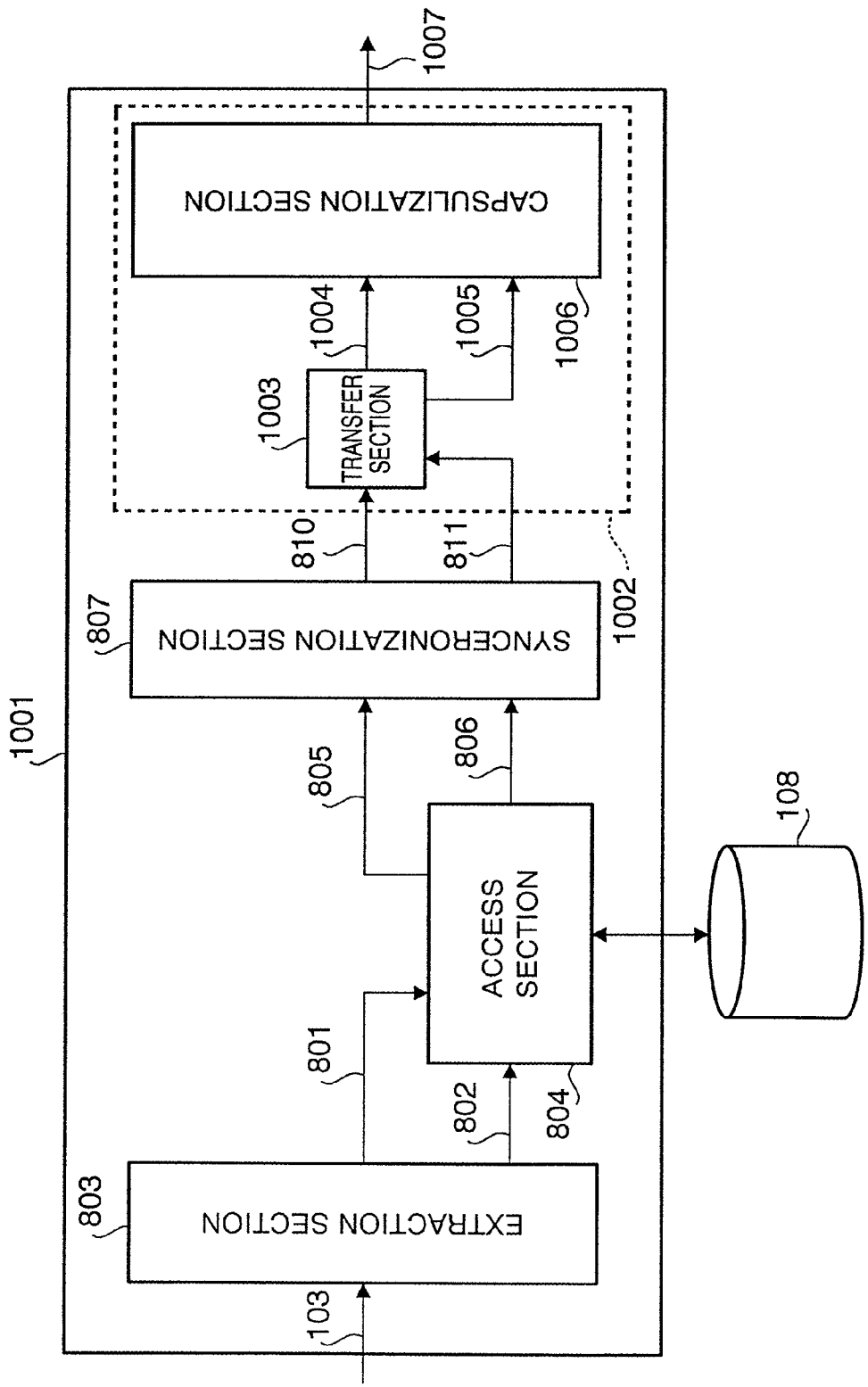
FIG. 10 is a block diagram of an information usage section according to Embodiment 3 of the present invention.

Next, an information processing method according to Embodiment 3 of the present invention will be described. FIG. 10 is a block diagram of an information usage section 1001 according to Embodiment 3. Parts identical to those that have already been described are assigned the same reference numerals, and a description of these parts is omitted.

The information usage section 1001 according to Embodiment 3 has the core processing section 808 of the information usage section 1001 according to Embodiment 2 replaced by a core processing section 1002. Below, the information usage section 1001 will be described centering on the core processing section 1002.

The core processing section 1002 is provided with a transfer section 1003 and a capsulization section 1006.

The transfer section 1003 performs settings, such as a destination setting, for transferring an AV stream 810 and metadata 811 input from the synchronization section 807 to another information usage node. The transfer section 1003 performs time synchronization every MPU 303, and outputs an AV stream 1004 and metadata 1005 to the capsulization section 1006.

The capsulization section 1006 recapsulizes the input AV stream 1004 and metadata 1005 and transmits them to another node as a capsulized stream 1007. Since the capsulization section 1006 recapsulizes the AV stream 1004 and meta data 1005 in this way, loads haring can be performed while maintaining close synchronization between the metadata and AV stream processing times.

The operation of the capsulization section 1006 is similar to that of the capsulization section 207 according to Embodiment 1, and so a detailed description will be omitted here.

The operation of the information usage section 1101 will now be described below. The information usage section 1101 extracts an AV stream 801 and metadata 802 from the capsulized stream 103 input by the extraction section 803, and outputs them to the access section 804. After recording the AV stream 801 and metadata 802 in the storage section 108, the access section 804 reads an AV stream 805 and metadata 806, and outputs them to the synchronization section 807.

The synchronization section 807 performs time synchronization every MPU 303 for the AV stream 805 and metadata 806 read by the access section 804, and outputs them to the core processing section 1002. The core processing section 1002 performs settings for transferring the AV stream 810 and metadata 811 input by the transfer section 1003 to another information usage node, and performs time synchronization and output to the capsulization section 1006 every MPU 303. The capsulization section 1006 recapsulizes the input AV stream 1004 and metadata 1005 and transmits them to another node as a capsulized stream 1007.

By configuring the information usage section 1001 as described above, it is possible for the transfer section 1003 to perform settings for transferring the AV stream 810 and metadata 811 input from the synchronization section 807 to another information usage node, perform time synchronization and output to the capsulization step 23 every MPU 303, and for the capsulization section 1006 to recapsulize the AV stream 1004 and metadata 1005 input from the transfer section 1003 and transmit them to another node as a capsulized stream 1007.

As described above, according to Embodiment 3, it is possible for load sharing to be performed while maintaining close synchronization between the metadata and AV stream processing times, and also to make processing for a segment comprising part of a data stream variable, by providing in the information usage section 1001 an extraction section 803 for separating and extracting an AV stream and metadata, an access section 804 for reading and writing an AV stream and metadata in a storage section 108, a synchronization section 807 for performing synchronization of the read AV stream and metadata processing, and, in the core processing section 1002, a transfer section 1003 and a capsulization section 1006.

Moreover, according to Embodiment 3, it is also possible for information about the processing methods of the transfer section 1003 and capsulization section 1006, or a processing program itself, to be made metadata. Processing method here refers to processing for changing the place where metadata is inserted according to the transfer destination, for instance. By this means, it is possible for the information provision node 101 to send appropriate information for transferring and capsulizing metadata to the information usage node 106. As a result, it is possible for metadata to be transferred and capsulized appropriately by the information usage node 106.

Embodiment 4

Figure 11:
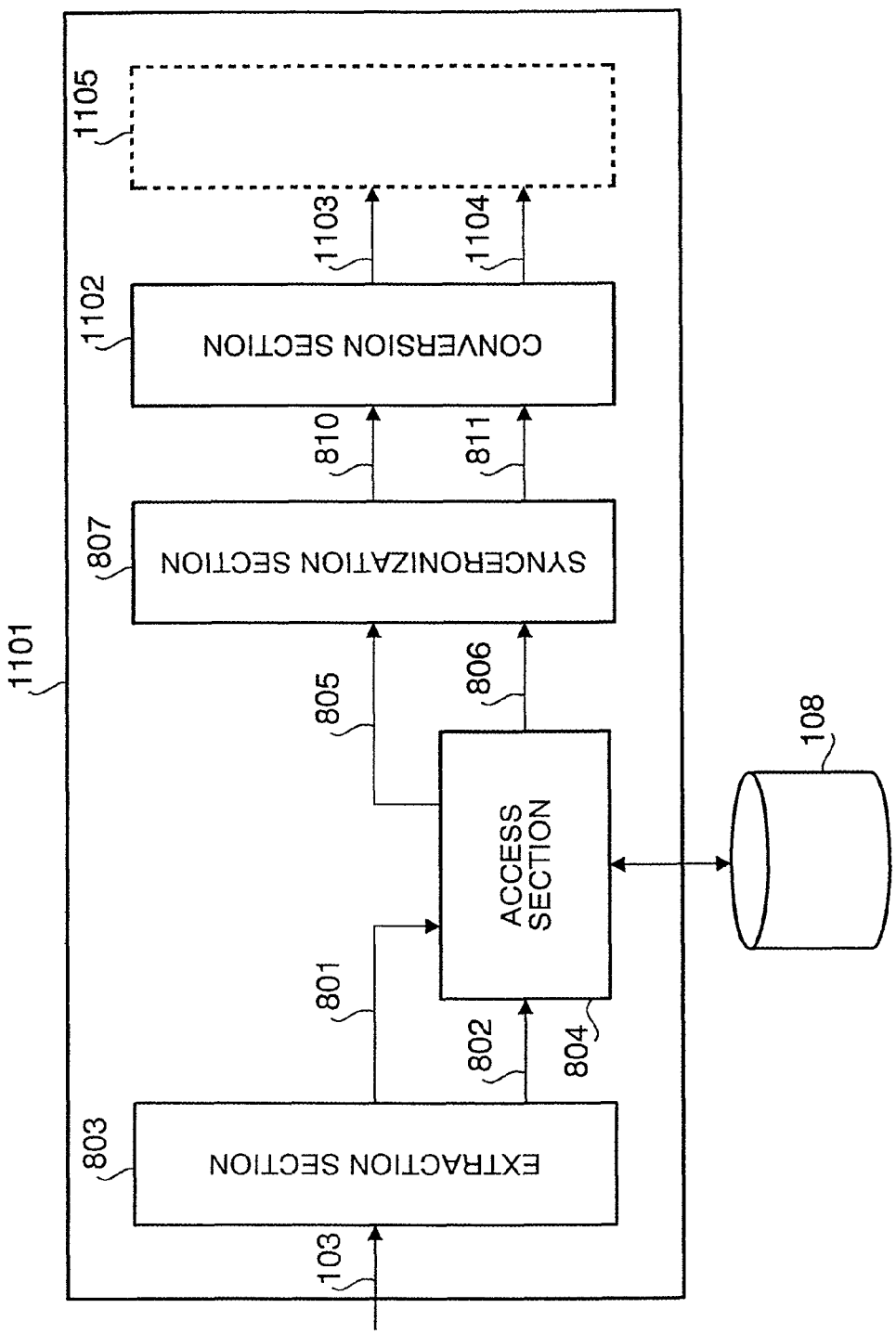
FIG. 11 is a block diagram of an information usage section according to Embodiment 4 of the present invention.

Next, an information processing system according to Embodiment 4 of the present invention will be described. FIG. 11 is a block diagram of an information usage section 1101 according to Embodiment 4. Parts identical to those that have already been described are assigned the same reference numerals, and a description of these parts is omitted.

The information usage section 1101 according to Embodiment 4 is equivalent to the information usage section 107 according to Embodiment 2 or the information usage section 1001 according to Embodiment 3 provided with a conversion section 1102. Below, the information usage section 1101 will be described centering on the conversion section 1102.

The conversion section 1102 converts an AV stream 810 in accordance with metadata 811, and outputs the result to the core processing section 1105 as a T-AV stream 1103 and T-metadata 1104. The conversion referred to here is color conversion according to the transmission destination terminal or display position, graphic information format conversion according to the transmission destination terminal or display position, or conversion of the voice format to an MP3 or portable phone format according to the transmission destination terminal.

The core processing section 1105 operates in the same way as either the core processing section 808 shown in Embodiment 2 or the core processing section 1002 shown in Embodiment 3.

If the core processing section 1105 is core processing section 808, the core processing section 1105 is provided with a display section 809. In this case the display section 809 performs display while carrying out time synchronization of the input T-AV stream 1103 and T-metadata 1104.

If the core processing section 1105 is core processing section 1002, the core processing section 1105 is provided with a transfer section 1003 and capsulization section 1006. In this case, the transfer section 1003 performs settings for transferring the T-AV stream 1103 and T-metadata 1104 input by the transfer section 1003 to another information usage node, and performs time synchronization and output to the capsulization section 1006 every MPU 303. The operation of the capsulization section according to Embodiment 3 is similar to that of the capsulization section 207 of Embodiment 1.

The operation of the information usage section 1101 will now be described below. The information usage section 1101 extracts an AV stream 801 and metadata 802 from the capsulized stream 103 input by the extraction section 803, and outputs them to the access section 804. After recording the AV stream 801 and metadata 802 in the storage section 108, the access section 804 reads an AV stream 805 and metadata 806, and outputs them to the synchronization section 807. The synchronization section 807 performs time synchronization every MPU 303 for the AV stream 805 and metadata 806 read by the access section 804, and outputs them to the conversion section 1102. The conversion section 1102 then converts AV stream 810 according to metadata 811, and outputs the results to the core processing section 1105 as a T-AV stream 1103 and T-metadata 1104.

Then, if the core processing section 1105 is the core processing section 808 according to Embodiment 2, the display section 809 performs display while carrying out time synchronization of the input T-AV stream 1103 and T-metadata 1104. If the core processing section 1105 is the core processing section 1002 according to Embodiment 1, the transfer section 1003 performs settings for transferring the T-AV stream 1103 and T-metadata 1104 input by the transfer section 1003 to another information usage node, and performs time synchronization and output to the capsulization section 1006 every MPU 303. The capsulization section 1006 recapsulizes the input T-AV stream 1103 and T-metadata 1104, and transmits them as a capsulized stream 1007.

As described above, according to Embodiment 4, it is possible for the place where conversion processing is performed according to metadata to be made variable by having the information usage section 1101 provided with an extraction section 803 for separating and extracting an AV stream and metadata, an access section 804 for reading and writing an AV stream and metadata in a storage section 108, a synchronization section 807 for performing synchronization of the read AV stream and metadata processing, and, as the core processing section 1105, a usage program composed of a display section 809 or a transfer section 1003 and capsulization section 1006. The place where conversion processing is performed may be, for example, a server, terminal, network node (gateway), or the like.

Moreover, according to Embodiment 4, it is possible to make processing for a segment comprising part of an AV stream variable. Also, AV stream and metadata conversion can be made possible.

Furthermore, according to Embodiment 4, performing further processing on a converted AV stream and metadata can be made possible.

Still further, according to Embodiment 4, by using a structured description written using XML for metadata and metadata units, and performing structured description re-format from metadata to units and from units to metadata, it is possible to extend the degree of freedom for designing metadata for processing an AV stream, and a structured description written in XML, etc., can be used directly as metadata.

In addition, according to Embodiment 4, it is possible for information relating to methods for processing metadata in the core processing section 1105—the display method, transfer method, and capsulization method—to be made metadata.

Embodiment 5

Figure 12:
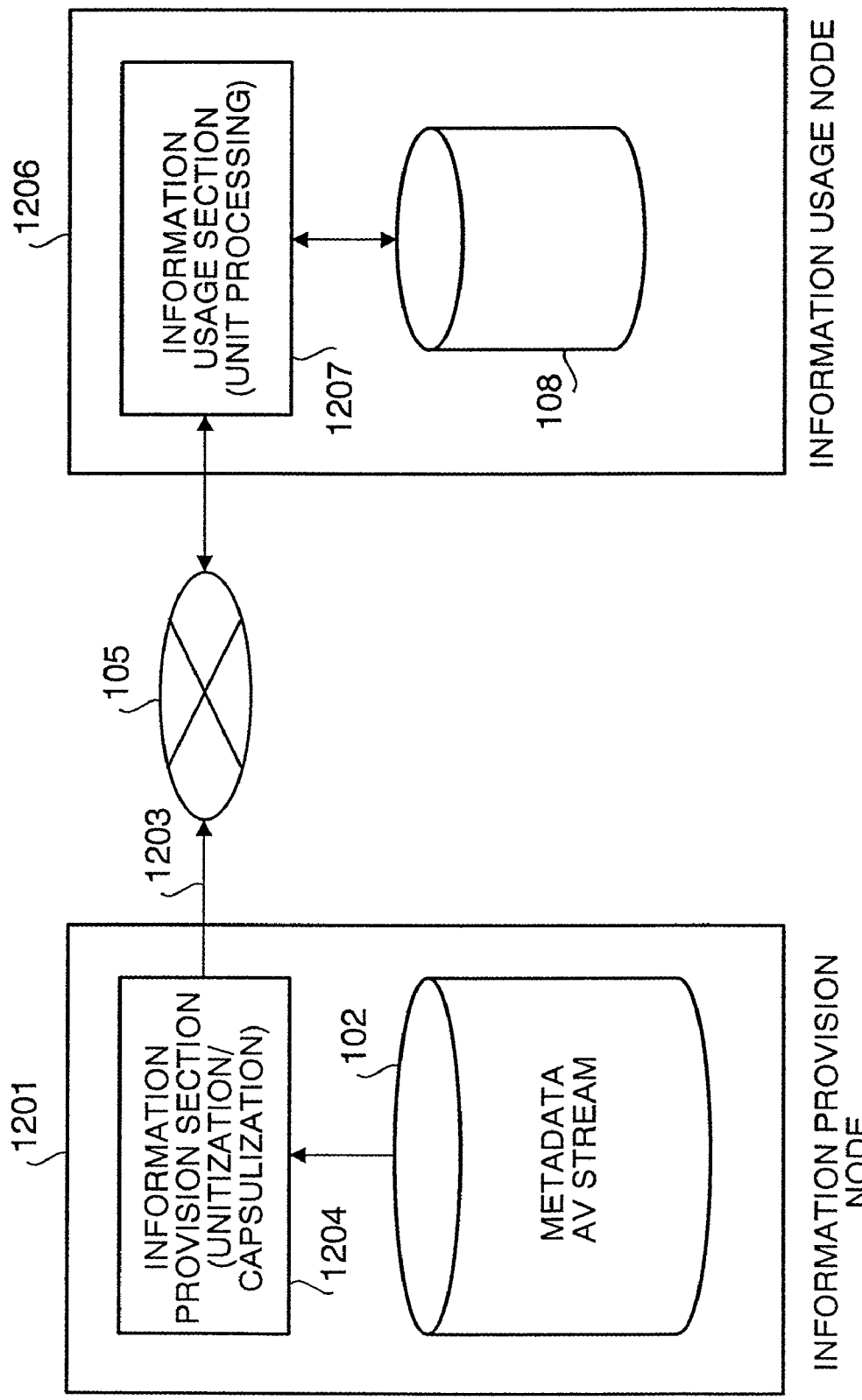
FIG. 12 is a block diagram of an information processing system according to Embodiment 5 of the present invention.

Next, an information processing system according to Embodiment 5 of the present invention will be described. FIG. 12 is a block diagram of an information processing system according to Embodiment 5. Parts that have already been described are assigned the same reference numerals.

Embodiment 5 has a configuration that omits the processing for synchronizing an AV stream and metadata from the information provision section 104 according to Embodiment 1. By omitting synchronization processing in this way, when synchronization of an AV stream and metadata is not necessary, processing speed can be increased by omitting synchronization processing and the configuration can be simplified. Examples of cases where synchronization of an AV stream and metadata need not be performed include cases where metadata is sent all together as with header information and processing need only be performed unit by unit, where it is sufficient for metadata to be synchronized implicitly with the AV stream, where it is sufficient for predetermined control to be performed by the terminal on the information usage side, and where metadata need not be processed in real time.

The configuration of an information processing system according to Embodiment 5 will now be described below.

An information provision node 1201 is provided with a storage section 102 in which an AV stream and AV stream related metadata are stored. The metadata is data that describes the related AV stream, or data for processing the metadata itself, or the like. Also provided in the information provision node 1201 is an information provision section 1204 that capsulizes the AV stream and metadata stored in the storage section 102 and generates and outputs a capsulized stream 1203. The information provision section 1204 transmits the capsulized stream 1203 via a network 105 to an information usage node 1206, which is an apparatus on the information receiving side.

Meanwhile, the information usage node 1206 is provided with an information usage section 1207 that extracts an AV stream and metadata from the capsulized stream 1203 and executes predetermined processing on them in order to use them. The information usage node 1206 is also provided with a storage section 108 that stores the AV stream and metadata extracted by the information usage section 1207. The information usage section 1207 reads the AV stream and metadata stored in the storage section 108 in order to use them.

Figure 13:
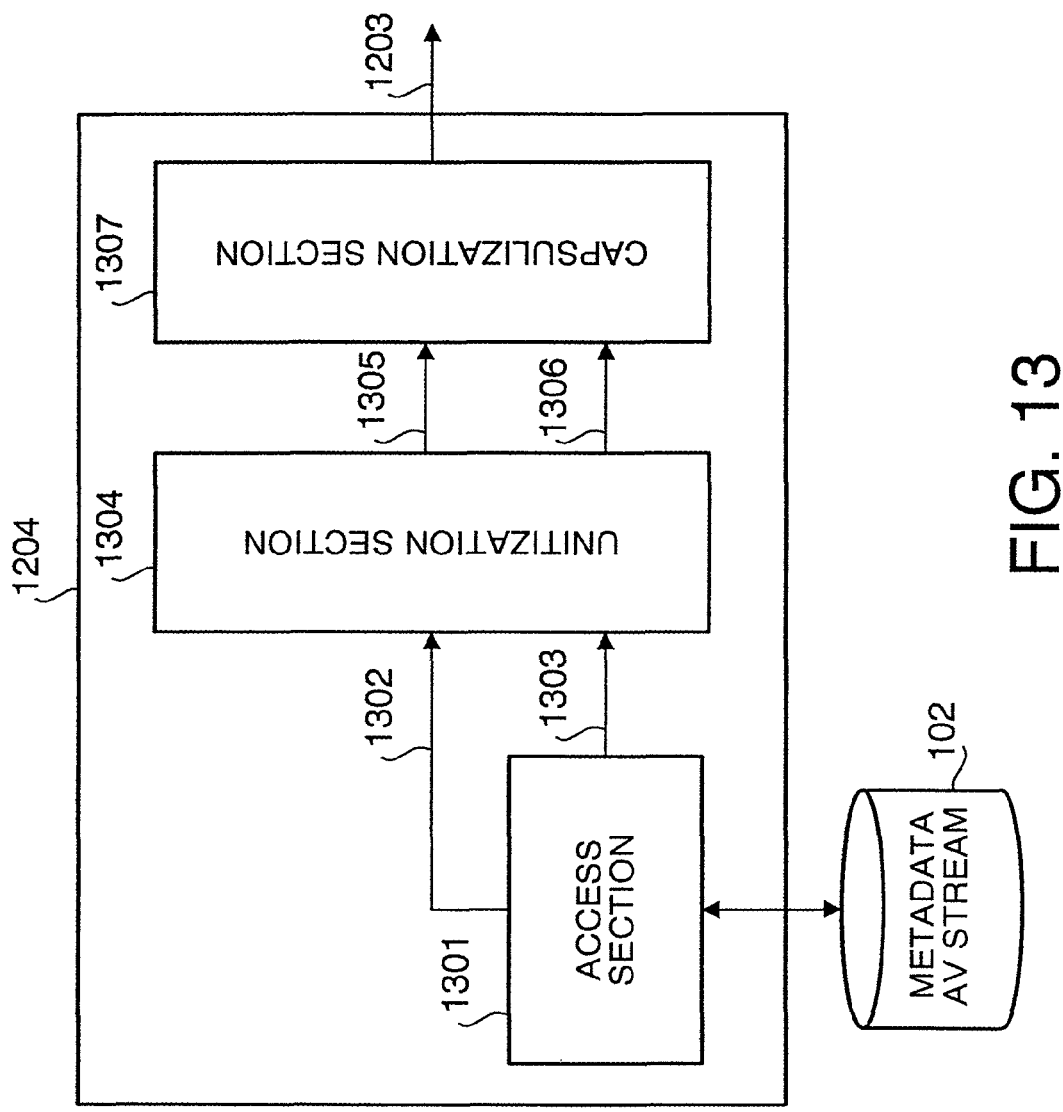
FIG. 13 is a block diagram of an information processing section according to Embodiment 5.

Next, the information provision section 1204 will be described using FIG. 13. FIG. 13 is a block diagram of an information provision section according to Embodiment 5.

The information provision section 1204 is provided with an access section 1301 that reads an AV stream and metadata from the storage section 102. The access section 1301 outputs an AV stream 1302 and metadata 1303 to a unitization section 1304.

The unitization section 1304 reforms metadata 1306 read by the access section 1301 into MPUs 303, and also outputs the synchronized AV stream 1305 and metadata 1306 read by the access section 1301 to a capsulization section 1307.

The capsulization section 1307 capsulizes the input AV stream 1305 and metadata 1306, and transmits them to the information usage node 1206 as a capsulized stream 1203.

In Embodiment 5, as in Embodiment 1, metadata is unitized to enable it to be executed in parts. Then, the AV stream and metadata units are packetized, data stream packets and metadata unit packets are capsulized, and a capsulized stream is generated.

The operation of the information provision section 1204 of the present invention will be described in detail below. Details of the AV stream 1302 and metadata 1303 stored in the storage section 102 are the same as for the AV stream 202 and metadata 203 according to Embodiment 1, so a description of these will be omitted here.

With the above-described configuration, metadata 1303 and an AV stream 1302 are read from the storage section 102 by the access section 1301. Then the access section 1301 outputs the read AV stream 1302 and metadata 1303 to the unitization section 1304.

On receiving the AV stream 1302 and metadata 1303, the unitization section 1304 first proceeds to processing for unitizing the metadata 1303.

Definitions of the metadata 1303 and MPUs 303 are the same as for the metadata 203 according to Embodiment 1 and the MPUs 303 described in Embodiment 1, so a description of these will be omitted here. Also, the process of unitization of the metadata 1303 is the same as for unitization of the metadata 203 according to Embodiment 1, so a description of this will be omitted here.

According to metadata definition 401 shown in FIG. 4A, metadata 1303 is represented by a collection of MPU definitions 402. Therefore, metadata 1303 is given a structured description by means of metadata definition 401, and is stored in the storage section 102 as metadata (XML instance) 501 shown in FIG. 5A.

Also, according to MPU definition 402 shown in FIG. 4B, an MPU 303 is represented by a collection of metadata defined by user_defined.dtd. Therefore, MPUs 303 are given a structured description for each MPU by means of MPU definitions 402, and are stored in the storage section 102 as MPU (XML instance) 502 shown in FIG. 5B.

An MPU 303 has contents <mpu> to </mpu>. That is to say, if there is information from <mpu> to </mpu>, the unitization section 1304 can grasp MPU 303 contents and can perform MPU 303 processing. For this reason, when picking out an MPU 303 from metadata 1303, the unitization section 1304 extracts the contents on the inside of a tag called an MPU tag (here, <mpu>) defined by an MPU definition 402.

By having metadata 1303 composed of lower-level information MPUs 303 in this way, the unitization section 1304 can perform metadata 1303 processing for each MPU 303. By this means, the unitization section 1304 can process AV data 1302 and metadata 1303 unit by unit.

Next, as in Embodiment 1, the capsulization section 1307 capsulizes metadata 1306 sent from the unitization section 1304 using the syntax shown in FIG. 6.

The capsulization section 1307 then capsulizes the AV stream segment for processing specified by the first packet's processing start time 607 and duration 608, and part of the metadata 1303 corresponding to the segment for processing, as a capsulized stream (private PES).

The unitization section 1304 then packetizes MPUs 303 into private PES packets and interleaves these with video PES packets and audio PES packets.

Then the capsulization section 207 capsulizes the input AV stream 1305 and metadata 1306, and transmits them as a capsulized stream 1203.

As described above, according to Embodiment 5, metadata can be re-formatted unit by unit and capsulized with an AV stream by providing a unitization section 1304 that unitizes the AV stream and metadata, and a capsulization section 1307 that capsulizes the metadata unit by unit with the AV stream. By this means, it becomes possible to perform partial execution of metadata, and to carry out program distribution for processing a segment comprising part of an AV stream, speeding up of response times, reduction of the necessary storage capacity, and reduction of network traffic.

Moreover, since Embodiment 5, unlike Embodiment 1, omits synchronization processing, when synchronization of an AV stream and metadata is not necessary, processing speed can be increased by omitting synchronization processing and the configuration can be simplified.

Embodiment 6

Figure 14:
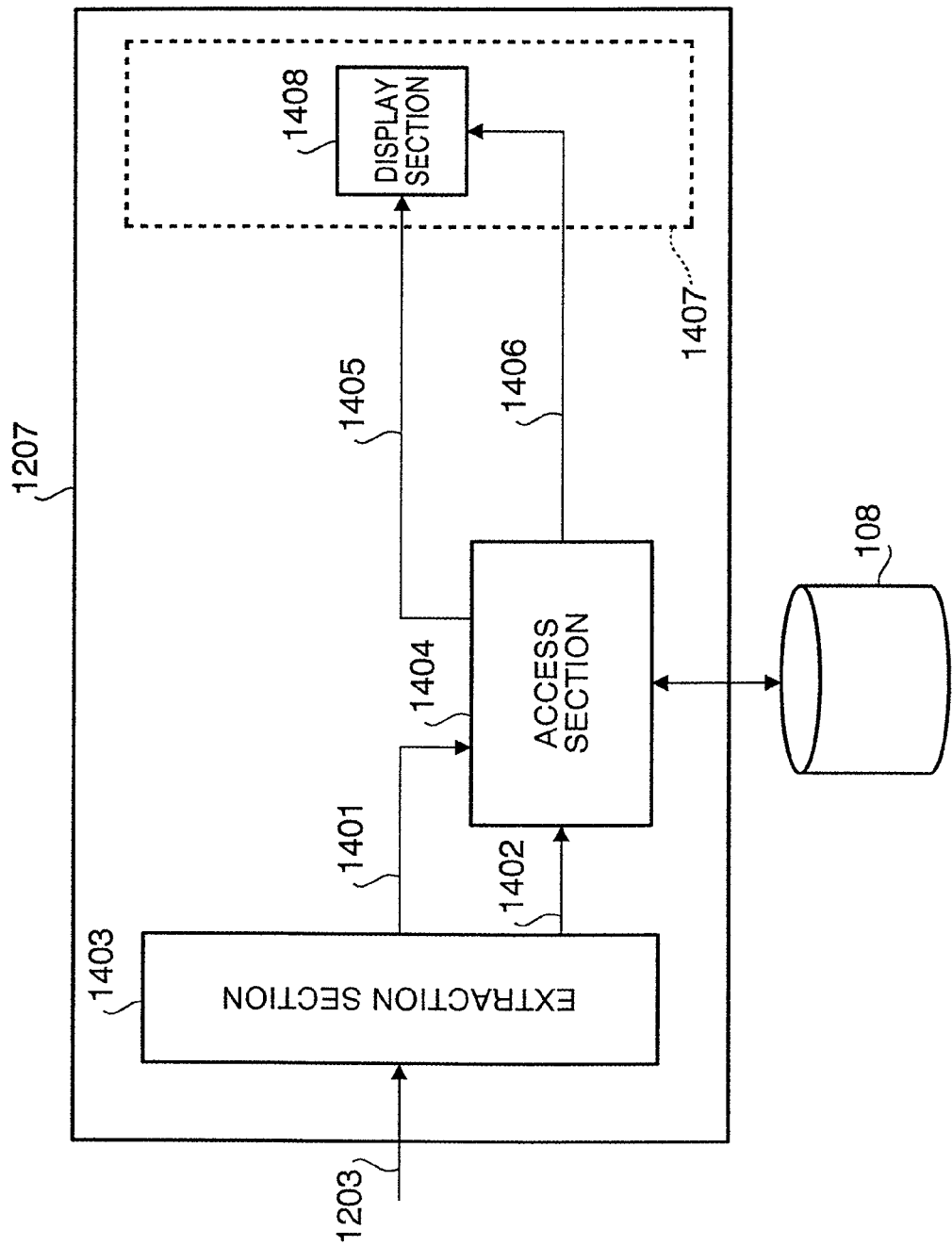
FIG. 14 is a block diagram of an information usage section according to Embodiment 4 of the present invention according to Embodiment 6.
Figure 15:
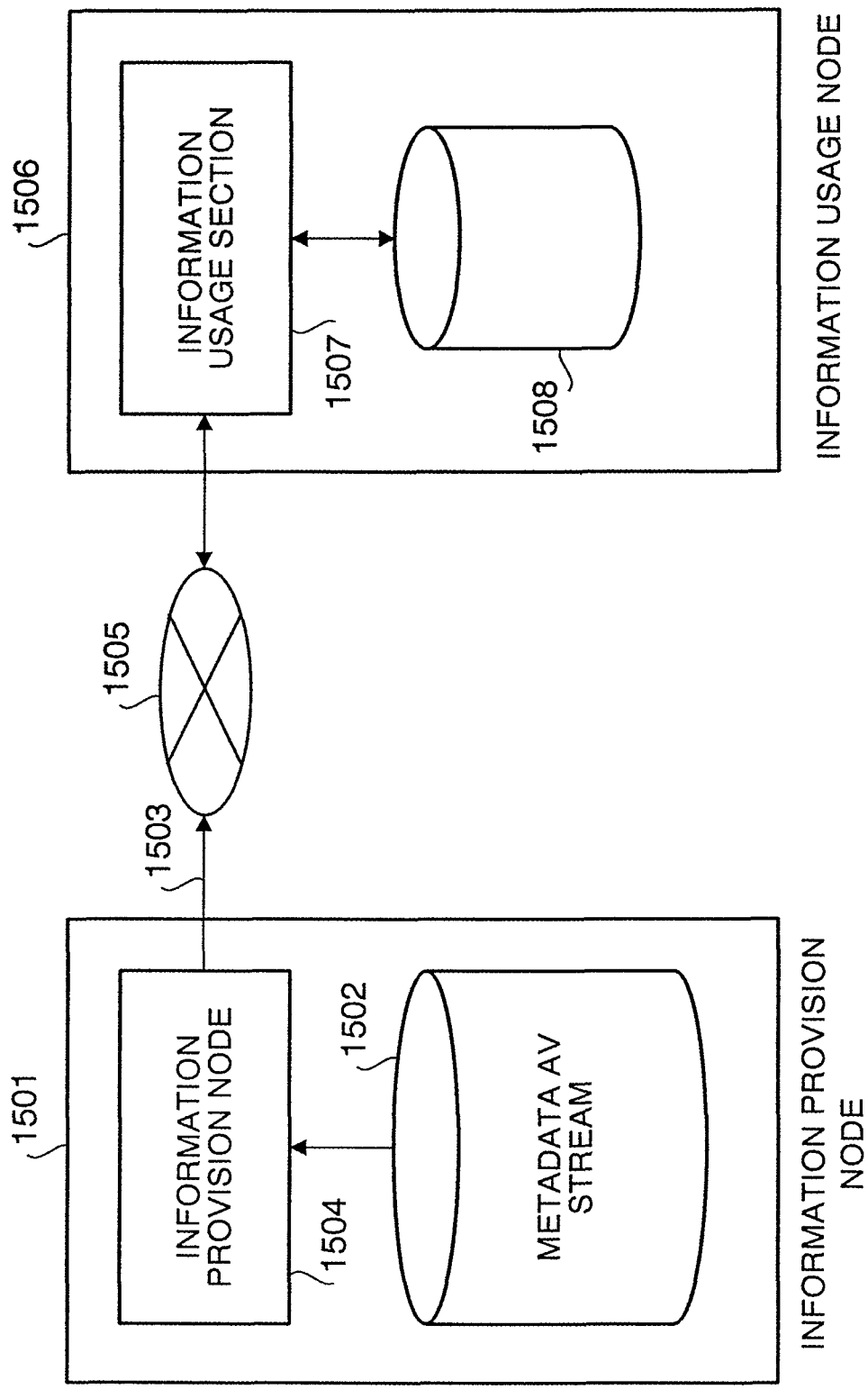
FIG. 15 is a block diagram of a conventional information processing system.
Figure 16:
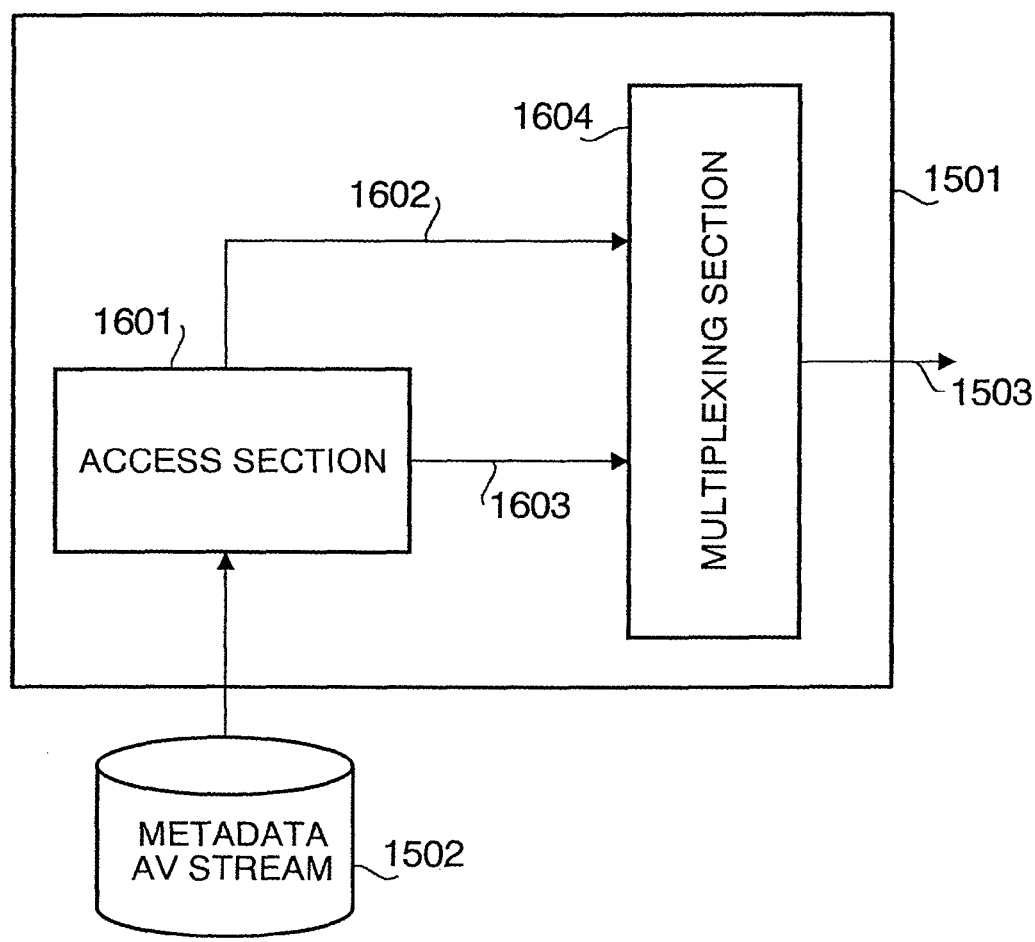
FIG. 16 is a detailed drawing of a conventional information provision section.
Figure 17:
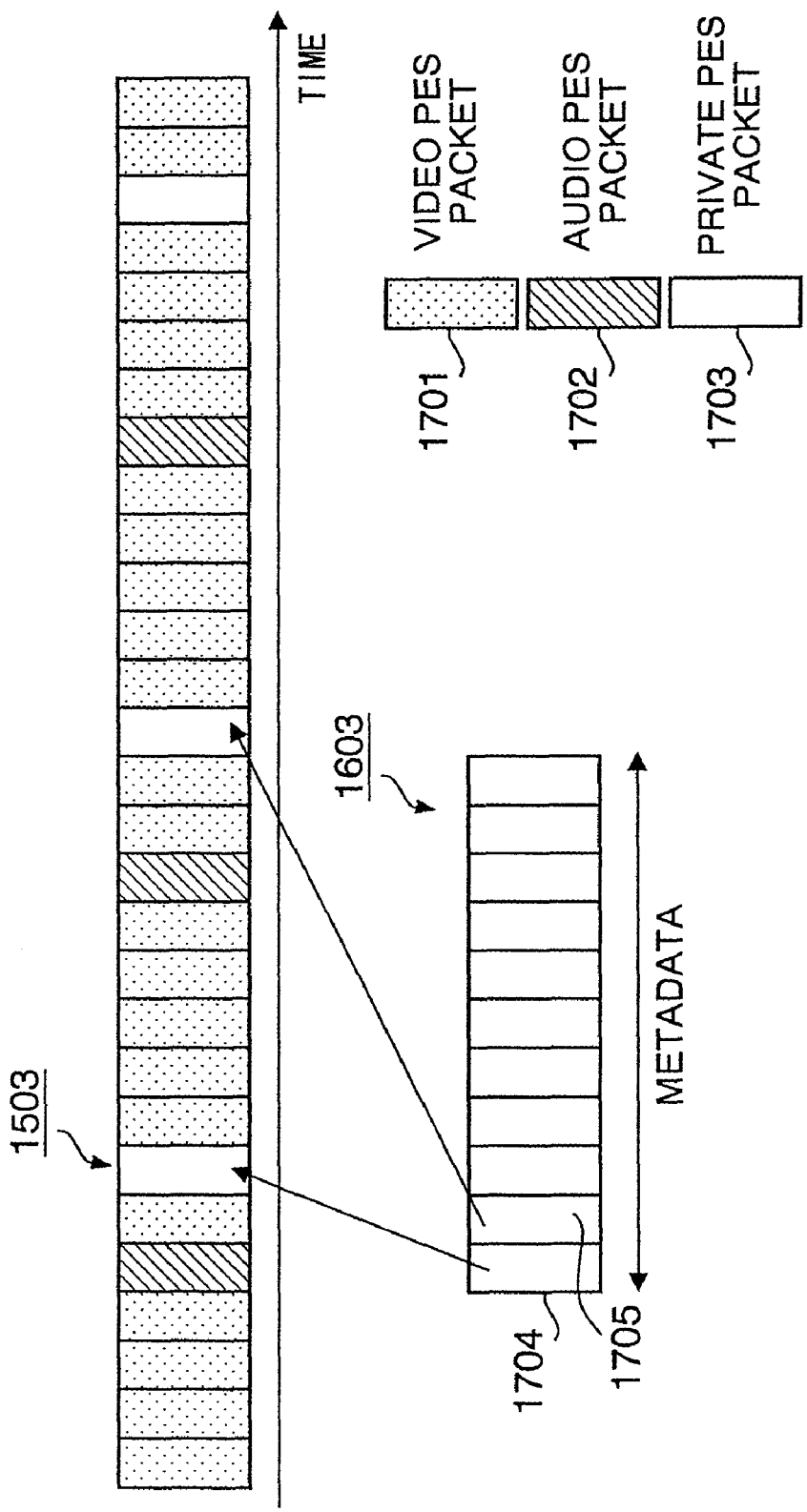
FIG. 17 is a drawing showing the configuration of a conventional multiplex stream.
Figure 18:
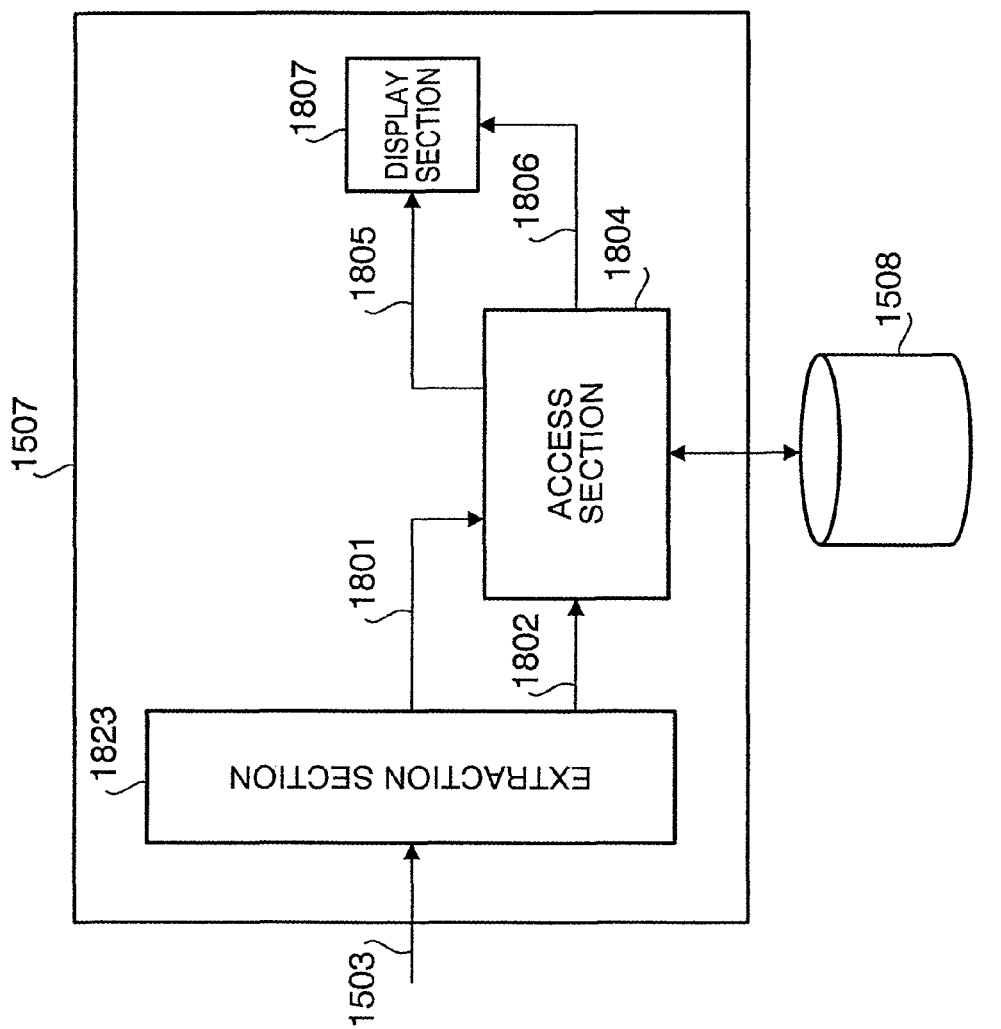
FIG. 18 is a detailed drawing of a conventional information usage section.
Figure 19:
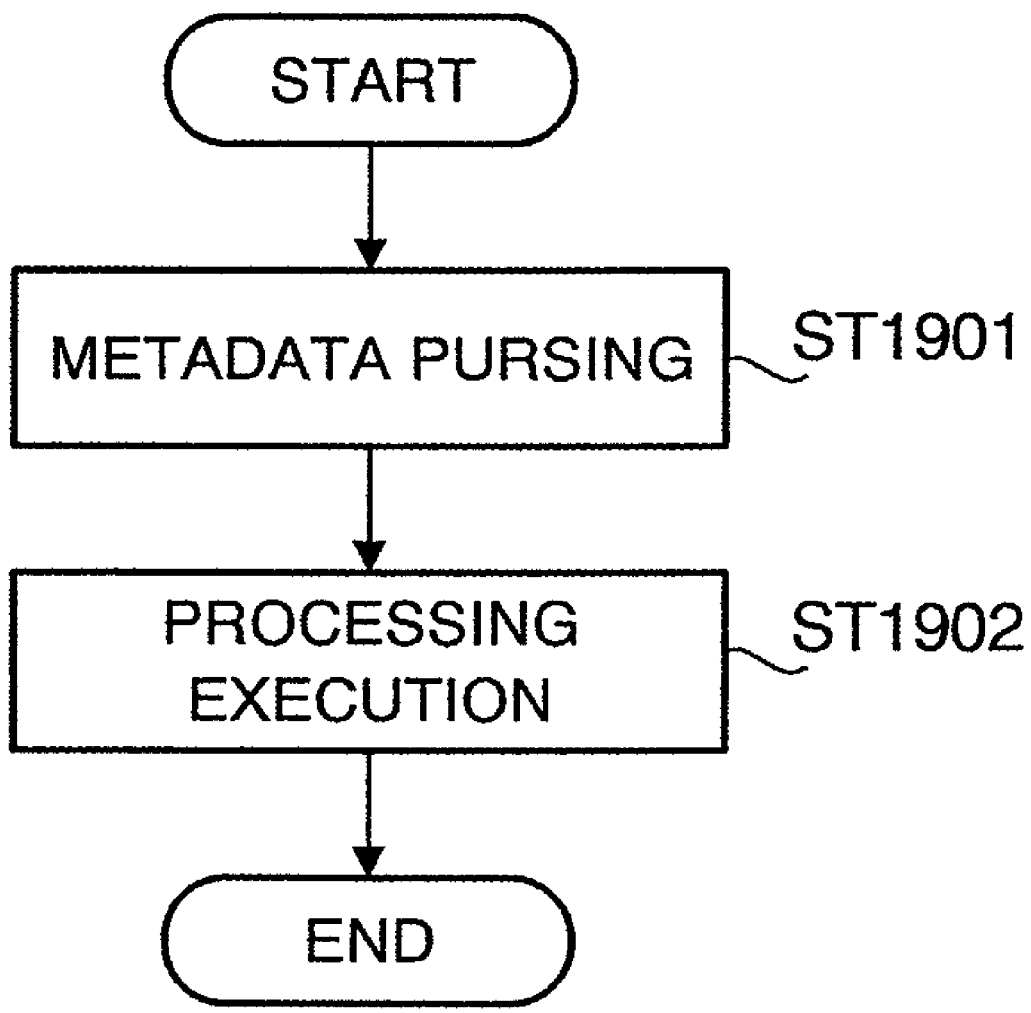
FIG. 19 is a processing flowchart for a conventional extraction section.

Next, an information processing system according to Embodiment 6 of the present invention will be described. FIG. 14 is a block diagram of an information usage section 1207 according to Embodiment 6.

Embodiment 6 has a configuration that omits the processing for synchronizing an AV stream and metadata from the information usage section 107 according to Embodiment 2.

By omitting synchronization processing in this way, when synchronization of an AV stream and metadata is not necessary, processing speed can be increased by omitting synchronization processing and the configuration can be simplified. Examples of cases where synchronization of an AV stream and metadata need not be performed include cases where metadata is sent all together as with header information and processing need only be performed unit by unit, where it is sufficient for metadata to be synchronized implicitly with the AV stream, where it is sufficient for predetermined control to be performed by the terminal on the information usage side, and where metadata need not be processed in real time.

The configuration of an information processing system according to Embodiment 6 will now be described below.

An information usage section 1207 is provided with an extraction section 1403 that extracts and outputs an AV stream 1401 and metadata 1402 from an input capsulized stream 1203. The extraction section 1403 outputs the extracted AV stream 1401 and metadata 1402 to an access section 1404.

The access section 1404 records the AV stream 1401 and metadata 1402 in a storage section 108. Also, the access section 1404 reads an AV stream 1405 and metadata 1406 stored in the storage section 108, and outputs them to a core processing section 1407.

The core processing section 1407 operates in the same way as the core processing section 808 shown in Embodiment 2. If the core processing section 1105 is core processing section 808, the core processing section 1407 is provided with a display section 1408. In this case the display section 1408 displays the input AV stream 1405 and metadata 1406.

In this way, the information usage section 1207 extracts an AV stream 1401 and metadata 1402 from the capsulized stream 1203 in the extraction section 1403. Then, the display section 1408 displays metadata 1406 and AV stream 1405 unit by unit.

The operation of the information usage section 1207 will now be described below. The information usage section 1207 extracts an AV stream 1401 and metadata 1402 from the capsulized stream 1203 input by the extraction section 1403, and outputs them to the access section 1404. After recording the AV stream 1401 and metadata 1402 in the storage section 108, the access section 1404 reads an AV stream 1405 and metadata 1406, and outputs them to the core processing section 1407. In the core processing section 1407, the display section 1408 displays the input AV stream 1405 and metadata 1406.

As described above, according to Embodiment 6, it is possible to make processing for a segment comprising part of a data stream variable by providing an extraction section 1403 for separating and extracting an AV stream and metadata, an access section 1404 for reading and writing an AV stream and metadata in a storage section 108, and a display section 1408, which is a core processing section 1407.

Moreover, since Embodiment 6, unlike Embodiment 2, omits synchronization processing, when synchronization of an AV stream and metadata is not necessary, processing speed can be increased by omitting synchronization processing and the configuration can be simplified.

Embodiment 6 has been described as having a configuration in which the synchronization section 807 is omitted from Embodiment 2, but a configuration may also be used in which the synchronization section 807 is omitted from Embodiment 3 or 4.

In Embodiment 1 to Embodiment 6, each processing section is configured by having all or part of the respective operations stored as a program (software) on a computerreadable storage medium such as a CD-ROM or DVD, and having the operations of each processing section performed by the CPU of a computer, or the like, by having a computer read the program.

A mode is also possible whereby all or part of the operations of each processing section are stored on a storage medium on communication means such as the Internet or the like as a program (software), the program is downloaded to an information terminal via the Internet or the like, and the operations of each processing section are performed by the information terminal.

A mode is also possible whereby each processing section is configured using dedicated hardware.

In Embodiment 1 to Embodiment 6, descriptions have used an AV stream as a content data stream with timewise continuity, but the same kind of effects as in the above-described embodiments can be obtained with not an AV stream but another stream, file, or small-volume information, as long as its use as a stream is considered useful.

In Embodiment 1 to Embodiment 6, metadata definitions and MPU definitions are performed using DTD of XML, but XML RDF or XML Schema may be used, or other definition means may also be used.

In Embodiment 1 to Embodiment 6, packetization has been described with MPEG-2 system PES packets, but an MPEG-1 system, MPEG-4, SMPTE Ancillary Data Packet, or another transmission format, streaming format, or file format may also be used.

In Embodiment 1 to Embodiment 6, private PES has been used for the description of the transmission layer for sending metadata, but metadata PES, MPEG-7 PES, MPEG-2 PSI (Program Specific Information) Section (so-called carousel) promised for the future may also be used as a transmission layer.

In Embodiment 1 to Embodiment 4, as a synchronization variation, one MPU may also be inserted repeatedly to enable the necessary data to be received when starting reception midway.

In Embodiment 1 to Embodiment 6, the network 105 or 1505 may be a terrestrial broadcasting network, a satellite broadcasting network, a cable television network, a line switching network, a packet switching network, an ATM, the Internet, or another network, package medium, hard disk, memory, or the like.

This application is based on the Japanese Patent Application No. HEI 11-200095 filed on Jul. 14, 1999, entire content of which is expressly incorporated by reference herein.

INDUSTRIAL APPLICABILITY

As described above, according to the present invention, firstly, partial execution of metadata is made possible, and it is possible to carry out program distribution for processing a segment comprising part of an AV stream, speeding up of response times, reduction of the necessary storage capacity, and reduction of network traffic, by reconfiguring metadata unit by unit and capsulizing it with an AV stream; secondly, close synchronization between metadata and AV stream processing times can be performed by making processing of a segment comprising part of an AV stream variable; and thirdly, it is possible to extend the degree of freedom for designing metadata for processing an AV stream, and to use a structured description written in XML, etc., directly as metadata, by using a structured description by means of XML for metadata and meta data units, and performing structured description re-format from metadata to units and from units to metadata.

The invention claimed is:

1. An information provisioning apparatus, comprising:
   an acquirer that acquires a data stream of content that is composed of a plurality of segments, and actual data of metadata that includes information related to the content and information related to the plurality of segments;
   a unitizer that divides the metadata into metadata processing units (MPU) corresponding to segments subjected to processing in the plurality of segments; and
   a capsulizer that generates a capsulized stream that includes packetized elementary stream (PES) packets acquired by packetizing the segments subjected to processing of the data stream and metadata PES packets acquired by packetizing at least one MPU, the metadata PES packets comprising control information of the metadata.

2. The information provisioning apparatus according to claim 1, wherein the control information of the metadata comprises at least one of a metadata type, a time synchronization flag and a data length of the MPU.

3. The information provisioning apparatus according to claim 1, wherein the control information of the metadata comprises a metadata type, a time synchronization flag, a start time and duration of audio/video (AV) data and a data length of the MPU.

4. The information provisioning apparatus according to claim 1, wherein the actual data of metadata comprises information related to content, information related to a display method, or a program.

5. The information provisioning apparatus according to claim 1, wherein the control information of the metadata comprises a time synchronization flag.

6. An information provisioning method, comprising:
   acquiring, by executing a set of instructions by a computer, a data stream of content that is composed of a plurality of segments, and actual data of metadata that includes information related to the content and information related to the plurality of segments;
   dividing, by executing the set of instructions by the computer, the metadata into metadata processing units (MPU) corresponding to segments subjected to processing in the plurality of segments; and
   generating, by executing the set of instructions by the computer, a capsulized stream that includes packetized elementary stream (PES) packets acquired by packetizing the segments subjected to processing of the data stream and metadata PES packets acquired by packetizing at least one MPU, the metadata PES packets comprising control information of the metadata.

7. The information provisioning method according to claim 6, wherein the control information of the metadata comprises at least one of a metadata type, a time synchronization flag and a data length of the MPU.

8. The information provisioning method according to claim 6, wherein the control information of the metadata comprises a metadata type, a time synchronization flag, a start time and duration of audio/video (AV) data and a data length of the MPU.

9. The information provisioning method according to claim 6, wherein the control information of the metadata comprises a time synchronization flag.

* * * * *